(12) United States Patent
Karpenko et al.

(10) Patent No.: US 8,880,246 B1
(45) Date of Patent: Nov. 4, 2014

(54) METHOD AND APPARATUS FOR DETERMINING SPACECRAFT MANEUVERS

(71) Applicants: Mark Karpenko, Marina, CA (US); Isaac Michael Ross, Monterey, CA (US)

(72) Inventors: Mark Karpenko, Marina, CA (US); Isaac Michael Ross, Monterey, CA (US)

(73) Assignee: United States of America as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 13/967,263

(22) Filed: Aug. 14, 2013

Related U.S. Application Data

(60) Provisional application No. 61/691,896, filed on Aug. 22, 2012.

(51) Int. Cl.
| | | |
|---|---|---|
| G05D 1/08 | (2006.01) | |
| B64G 1/28 | (2006.01) | |
| B64G 1/36 | (2006.01) | |
| B64G 1/24 | (2006.01) | |

(52) U.S. Cl.
CPC .... *B64G 1/286* (2013.01); *B64G 1/36* (2013.01); *B64G 1/24* (2013.01); *B64G 1/288* (2013.01)
USPC ............. 701/13; 701/3; 244/158.1; 244/164; 244/165

(58) Field of Classification Search
None
See application file for complete search history.

(56) References Cited

U.S. PATENT DOCUMENTS

| | | | |
|---|---|---|---|
| 6,039,290 A | | 3/2000 | Wie et al. |
| 6,131,056 A | * | 10/2000 | Bailey et al. .................... 701/13 |
| 6,154,691 A | | 11/2000 | Bailey |
| 6,305,647 B1 | * | 10/2001 | Defendini et al. ............ 244/165 |
| 6,360,996 B1 | * | 3/2002 | Bockman et al. ............. 244/165 |
| 6,441,776 B1 | * | 8/2002 | Hein et al. ..................... 244/164 |
| 6,917,862 B2 | * | 7/2005 | Wie ................................ 701/13 |
| 7,370,833 B2 | * | 5/2008 | Johnson et al. ............... 244/165 |
| 7,464,899 B2 | * | 12/2008 | Elgersma et al. ............... 701/13 |
| 7,693,619 B2 | * | 4/2010 | Elgersma et al. ............... 701/13 |
| 7,795,566 B2 | * | 9/2010 | Koenig ............................. 701/3 |
| 7,805,226 B2 | * | 9/2010 | Hamilton et al. ............... 701/13 |
| 7,904,214 B2 | | 3/2011 | Heiberg |
| 7,974,746 B2 | * | 7/2011 | Heiberg .......................... 701/13 |
| 8,038,101 B2 | * | 10/2011 | Ogo et al. ..................... 244/165 |
| 8,380,370 B2 | * | 2/2013 | Liu et al. ........................ 701/13 |
| 2006/0022091 A1 | * | 2/2006 | Peck et al. .................... 244/165 |
| 2009/0039202 A1 | * | 2/2009 | Ogo et al. ....................... 701/13 |
| 2010/0140413 A1 | * | 6/2010 | Bailey ............................. 701/13 |
| 2010/0152953 A1 | * | 6/2010 | Hamilton ......................... 701/1 |
| 2010/0250031 A1 | * | 9/2010 | Paschall et al. .................. 701/8 |

OTHER PUBLICATIONS

Kurokawa, H., "Survey of Theory and Steering Laws of Single-Gimbal Control Moment Gyros," Journal of Guidance, Control, and Dynamics, vol. 30, No. 5, 2007, pp. 1331-1340.

(Continued)

*Primary Examiner* — John R Olszewski
*Assistant Examiner* — David Merlino
(74) *Attorney, Agent, or Firm* — Naval Postgraduate School; Lisa A. Norris

(57) ABSTRACT

Methods and apparatus are presented for spacecraft operation in which a control problem is formulated using a control law or steering law as a path constraint or as a dynamic constraint, and the control problem is solved to provide a guidance command trajectory for use in operating spacecraft control momentum gyroscopes to guide the spacecraft from an initial state to a desired final state.

21 Claims, 11 Drawing Sheets

(56) References Cited

OTHER PUBLICATIONS

Paradiso, J., "Global Steering of Single Gimballed Control Moment Gyroscopes Using a Directed Search," Journal of Guidance, Control, and Dynamics, vol. 15, No. 5, 1992, pp. 1236-1244.

Bedrossian, N.S. et al., "Redundant Single Gimbal Control Moment Gyroscope Singularity Analysis," Journal of Guidance, Control, and Dynamics, vol. 13, No. 6, 1990, pp. 1096-1101.

Leve, F.A. et al., "Hybrid Steering Logic for Single-Gimbal Control Momentum Gyroscopes," Journal of Guidance, Control, and Dynamics, vol. 33, No. 4, 2010, pp. 1201-1212.

Wie, B. et al., "Singularity Robust Steering Logic for Redundant Single-Gimbal Control Moment Gyros," Journal of Guidance, Control, and Dynamics, vol. 24, No. 5, 2001, pp. 865-872.

Ford, K.A. et al., "Singularity Direction Avoidance Steering for Control-Moment Gyros," Journal of Guidance, Control, and Dynamics, vol. 23, No. 4, 2000, pp. 648-656.

Fahroo, F. et al., "Costate Estimation by a Legendre Pseudospectral Method," Journal of Guidance, Control, and Dynamics, vol. 24, No. 2, 2001, pp. 270-277.

Ross, I.M., "A Beginner's Guide to DIDO: A MATLAB Application Package for Solving Optimal Control Problems," Elissar TR-711, Elissar Global, Carmel, CA, Nov. 2007, pp. 1-38 [Online] Available: http://www.elissarglobal.com.

Fleming, A., et al., "Singularity-Free Optimal Steering of Control Moment Gyros," Proceedings of the 2005 AAS/AIAA Astrodynamics Specialist Confernece, Aug. 7-11, 2005, Lake Tahoe, CA, AAS Paper 05-418.

Fleming, A. et al., "Constrained, Minimum-Time Maneuvers for CMG Actuated Spacecraft," Proceedings of the 2009 AAS/AIAA Astrodynamics Specialist Conference, Aug. 9-13, 2009, Pittsburgh, PA, AAS Paper 09-362.

* cited by examiner

METHOD AND APPARATUS FOR DETERMINING SPACECRAFT MANEUVERS

REFERENCE TO RELATED APPLICATION

This application claims priority to and the benefit of U.S. Provisional Patent Application Ser. No. 61/691,896, filed Aug. 22, 2012, and entitled "METHOD FOR DETERMINING OPTIMIZED SPACECRAFT MANEUVERS", the entirety of which is hereby incorporated by reference.

BACKGROUND

The present disclosure relates to control of the attitude or orientation of spacecraft, for example, to position a telescope mounted to a satellite to obtain an image of an object by reorienting the satellite itself. A typical spacecraft is equipped with a group or array of three or more control moment gyroscopes (CMGs) to facilitate attitude control of the vehicle. Spacecraft attitude control techniques commonly involve Eigen axis rotations. Eigen axis rotations are desirable as they are intuitively simple to construct and provide the advantage of reorienting the spacecraft along the shortest circular arc between the starting and desired final attitude angles. The angular error defined by translation from a first orientation to a second orientation can be represented as rotation through a certain angle about a particular fixed axis, referred to as the Eigen axis of the rotation. Once the Eigen axis has been determined, two other axes that need not be aligned with the reference spacecraft body fixed frame may be selected to form an orthogonal set with the Eigen axis. Since the entire rotation from the initial to the final states is performed about the Eigen axis, the other two axes will always have zero angles to be traversed. Eigen axis rotations are normally implemented as rest-to-rest maneuvers. That is, the rotation is initiated from rest and terminated when the spacecraft is again at rest in the new desired orientation. A maneuver similar to an Eigen axis rotation can be constructed when it is desired to initiate a reorientation maneuver from a non-resting state and/or when it is desired to terminate a reorientation maneuver at a non-resting state. For such non-rest maneuvers, rotations will normally be carried out as simultaneous rotations about three orthogonal axes and designed similarly to an Eigen axis maneuver according to the kinematic differential equations.

Many spacecraft systems are used in a manner that demands expeditious reorientation. For instance, it is important in many satellite missions to perform attitude maneuvers as rapidly as possible, where the capacity of commercial Earth observing satellites can be improved by maneuvering more quickly to reduce the time needed to slew between image regions. By reducing the slew time, it is possible for the satellite to acquire additional images and maximize revenue. Accordingly, time-optimal attitude maneuvers have been the subject of extensive study, and such time-optimal reorientation maneuvers were demonstrated in flight, for the first time, on board the NASA space telescope TRACE. The effectiveness of a CMG-based satellite may be improved by integrating time-optimal (shortest-time) attitude maneuvers as part of normal system operations, where ground personnel may employ mission planning and scheduling algorithms utilizing shortest-time maneuvers to determine the highest valued sequence of imaging or other spacecraft operations for a given activity window. Before commanding the satellite, a detailed check of all system constraints is also conducted to verify the mission plan and to ensure that all relevant hardware and operational constraints have been met. Such preflight checks may also include simulating the spacecraft attitude control system to verify that the spacecraft will behave as expected and remain within safe limits when the planned maneuvers are executed on orbit.

CMG momentum control systems create a unique challenge for controlling the attitude of a spacecraft. In particular, unlike an array of reaction wheels, whose torque capability is fixed with respect to the vehicle frame, the torque capability of a CMG array varies continuously with the gimbal angles. Consequently, ensuring accurate torque production on the spacecraft body requires proper configuration of the CMGs relative to one another, for example, to avoid gimbal configurations that result in singular states wherein torque cannot be produced in a certain direction. CMGs also have gimbal rate and input torque constraints that can be violated during the operation of the spacecraft, particularly if the spacecraft angular rates exceed predetermined limits, potentially leading to a loss of control of the spacecraft. Because of these complexities, devising a mechanism to ensure the predictability of shortest-time and other desired reorientations or maneuvers is an important aspect of the maneuver design problem for CMG spacecraft. Accordingly improved methods and apparatus are needed for determining and implementing spacecraft maneuvers while maintaining operation within torque and other physical or operational limits.

SUMMARY OF DISCLOSURE

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

The present disclosure provides an approach for the design and implementation of shortest-time and other maneuvers for CMG spacecraft with consistent internal states, in which a control law or steering law is incorporated as a path constraint or as a dynamics constraint into the formulation of a control problem, and the control problem is solved to provide a guidance command trajectory for maneuvering a spacecraft via CMGs to guide the spacecraft in closed loop fashion from an initial state to a desired final state. In the discussion herein, the term "consistent internal states" refers to the degree of agreement between the desired spacecraft states obtained as the solution to an optimal control problem and the actual states of the spacecraft when a maneuver is executed. "Consistent internal states" refers to the condition where the difference between the desired spacecraft states and the actual spacecraft states is such that the desired and actual states are indistinguishable from one another. "Inconsistent internal states" thus refers to an undesirable condition where there may be large deviations between the desired and actual spacecraft states. The concepts of the present disclosure may be employed in shortest-time maneuvers (STMs) and/or in maneuvers selected with respect to lowest expenditure of energy or other design criteria or combinations thereof. In certain applications, for example, shortest-time maneuvers are designed by formulating and solving an appropriate minimum-time optimal control problem based on a nonlinear model of the CMG spacecraft dynamics. The inventors have appreciated that careful construction of the optimal control problem for predicable shortest-time maneuvers or other forms of maneuvering can be used to address some of the complexities of CMG systems directly, as part of the problem formulation. This approach advantageously mitigates the need to modify or adapt a control law or steering law currently in use in a closed-loop attitude control system, such as a steering law employed on an in-service satellite. In addition, the inventors have appreciated that the spacecraft internal states, in particular the CMG gimbal angles and/or the CMG gimbal rates, can deviate significantly from their desired values when a closed-loop implementation is derived from an open-loop solution. Thus, operational constraints can be violated when such maneuvers are implemented on orbit. The inventors have further found that the cause for this issue is an artifact of CMG steering law that is active in the closed-loop attitude control system but is not considered as part of the maneuver optimization in the prior art. Thus, the inventors have contemplated embedding CMG steering logic as part of the optimal control. Application of the proposed techniques and apparatus for embedding CMG steering logic (steering law) as part of the optimal control permits STMs or other optimized maneuvers to be implemented reliably using existing closed-loop attitude control architectures. In addition, a variety of existing CMG steering laws can be integrated as part of the maneuver design process. Time-optimal CMG maneuvers that exploit the desirable properties of singularity robust CMG steering can therefore be advantageously obtained using the proposed development.

In accordance with one or more aspects of the present disclosure, methods, computer readable mediums with computer executable instructions, and apparatus are provided for guiding a spacecraft between initial and final states using an array of control moment gyroscopes (CMGs). A method is provided, which includes receiving input data including initial and desired final spacecraft states, as well as a plurality of constraints that define desired limitations with respect to spacecraft attitude, spacecraft motion, and/or CMG operation, along with a steering law constraint based on a steering law used in operating the spacecraft. The method further includes formulating a control problem based at least in part on the input data including the steering law constraint, solving the control problem to provide a time-varying attitude command vector, and providing the time-varying attitude command vector as a guidance command input to an attitude controller of the spacecraft for operating the plurality of control momentum gyroscopes to guide the spacecraft from the initial state to the final state. The steering law constraint may be included as a path constraint or a dynamic constraint in various embodiments. For example, a steering law path constraint may be used which sets an upper and/or lower bound on the difference between a control allocation as the product of the steering law and the CMG gimbal angle rate vector. In another possible embodiment, the steering law constraint is included as a dynamic constraint in the control problem to define a product of the steering law and a control variable vector. The method may further include constructing an objective or cost function of a spacecraft system state and a control variable vector representing the CMG gimbal accelerations or rates. Moreover, the objective function may be constructed with respect to an overall maneuver time and/or maneuver energy expenditure in various implementations.

Further aspects of the present disclosure involve a spacecraft guidance system, including one or more processors programmed to implement the disclosed methods, as well as non-transitory computer readable mediums with computer executable instructions for spacecraft guidance according to the described methods.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION OF THE DISCLOSURE

Figure 1:
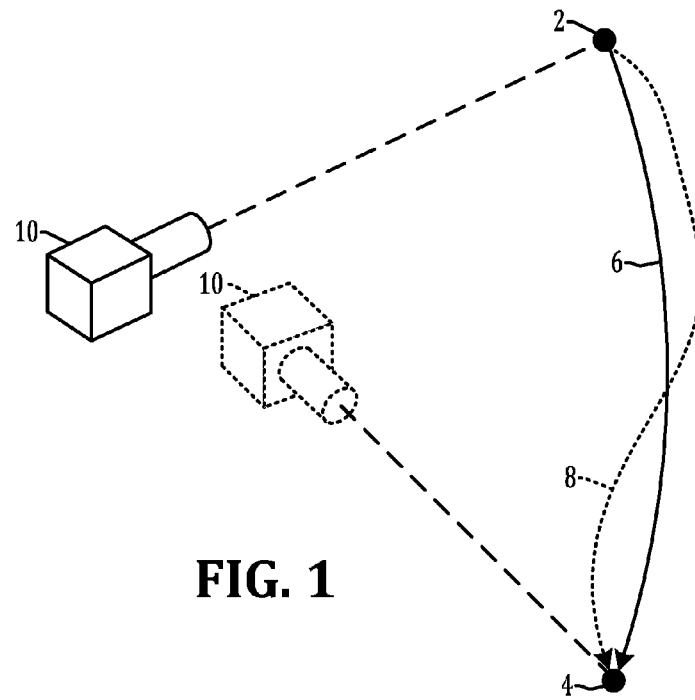
FIG. 1 is a perspective view illustrating translation of a satellite or other spacecraft from an initial orientation to a final orientation along an Eigen axis trajectory and along an exemplary optimal (non-Eigen axis) path.

One or more embodiments or implementations are set forth in conjunction with the drawings, where like reference numerals refer to like elements throughout, and where the various features are not necessarily drawn to scale. Control apparatus and methods are presented for guiding or maneuvering CMG-equipped spacecraft to transition from an initial state to a desired final state, wherein the disclosed concepts find utility in association with satellites, manned spacecraft, or any other form of spacecraft or vehicle.

Figure 2:
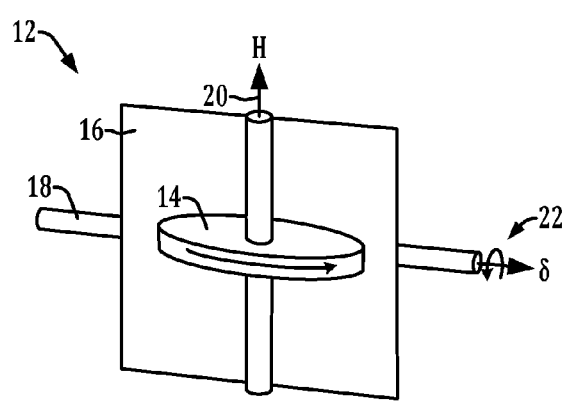
FIG. 2 is a simplified perspective view showing an exemplary control moment gyroscope (CMG) of a spacecraft that may be operated according to the techniques of the present disclosure.
Figure 3:
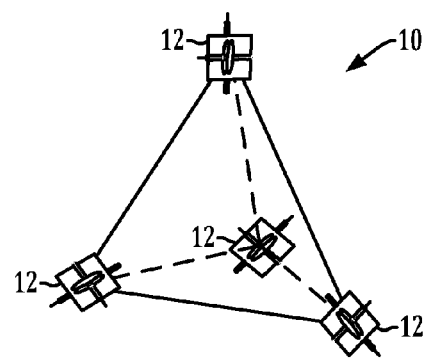
FIG. 3 illustrates positioning of four CMGs and corresponding gimbal axes for controlling a spacecraft attitude.

Referring initially to FIGS. 1-3, an exemplary CMG-equipped spacecraft 10 is illustrated undergoing such a maneuver between initial and final positions or attitudes. FIG. 1 illustrates an exemplary spacecraft 10 in a first position in which a telescope or camera thereof is aligned to obtain images of a first reference point 2, as well as in a second position (shown in dashed lines in the figure) with the telescope facing a second reference point 4. FIG. 1 further shows an arcuate Eigen axis path 6 representing one manner of translating the spacecraft 10 from the first position to the second position, as well as a non-Eigen axis path 8 (shown in dashed line), either of which can be achieved using the guidance-based attitude control concepts of the present disclosure. FIG. 2 illustrates an exemplary CMG 12 of the spacecraft 10, where the spacecraft 10 can have any number of CMGs 12, such as four or more having associated gimbal axes pointing in different directions in one example as shown in FIG. 3. The CMG 12 of FIG. 2 includes a rotating disk 14 as well as a rotor housing 16, with a gimbal axis 18 and a spin axis 20 about which the disk 14 rotates. In operation, the angle 22 of rotation of the CMG 12 about the gimbal axis 18 (i.e., the rotational gimbal angle δ) changes orientation of the spin axis 20, and thus changes the direction of momentum vector H for a given CMG 12. The vector cross product of the gimbal angle rate (δ') and the momentum vector H provides for a torque acting orthogonal to the plane of the rotor housing 16. As seen in FIG. 3, moreover, disposition of multiple CMGs 12 at different points relative to a structure of a spacecraft 10 and manipulation of the gimbal axes 22 of the various CMGs 12 allows controlled application of torques to the spacecraft 10 to provide three-dimensional control of the spacecraft orientation or attitude.

Referring also to FIGS. 4-8, the spacecraft 10 is equipped with an attitude control system 30 having an attitude controller 32 providing a torque command vector 32a ($T_{com}$) to a steering law component 34, which in turn provides gimbal angle rate command signals 34a (δ') to the CMGs 12 in order to control the angular orientation of the spacecraft 10. The attitude control system 30 can be implemented using any suitable hardware and/or processor-executed software or processor-executed firmware via one or more processors and associated electronic memory, including without limitation microprocessors, microcontrollers, DSPs, programmable logic, FPGAs, etc. In certain embodiments, one or more such processing elements is programmed via computer executable instructions stored in an onboard memory of the system 30 to perform the attitude control and guidance command attitude profile generation concepts disclosed herein. In this regard, the attitude controller 32 and the steering law 34 as well as other illustrated and described components of the attitude control system 30 can be implemented via processor-executed software components.

Figure 4:
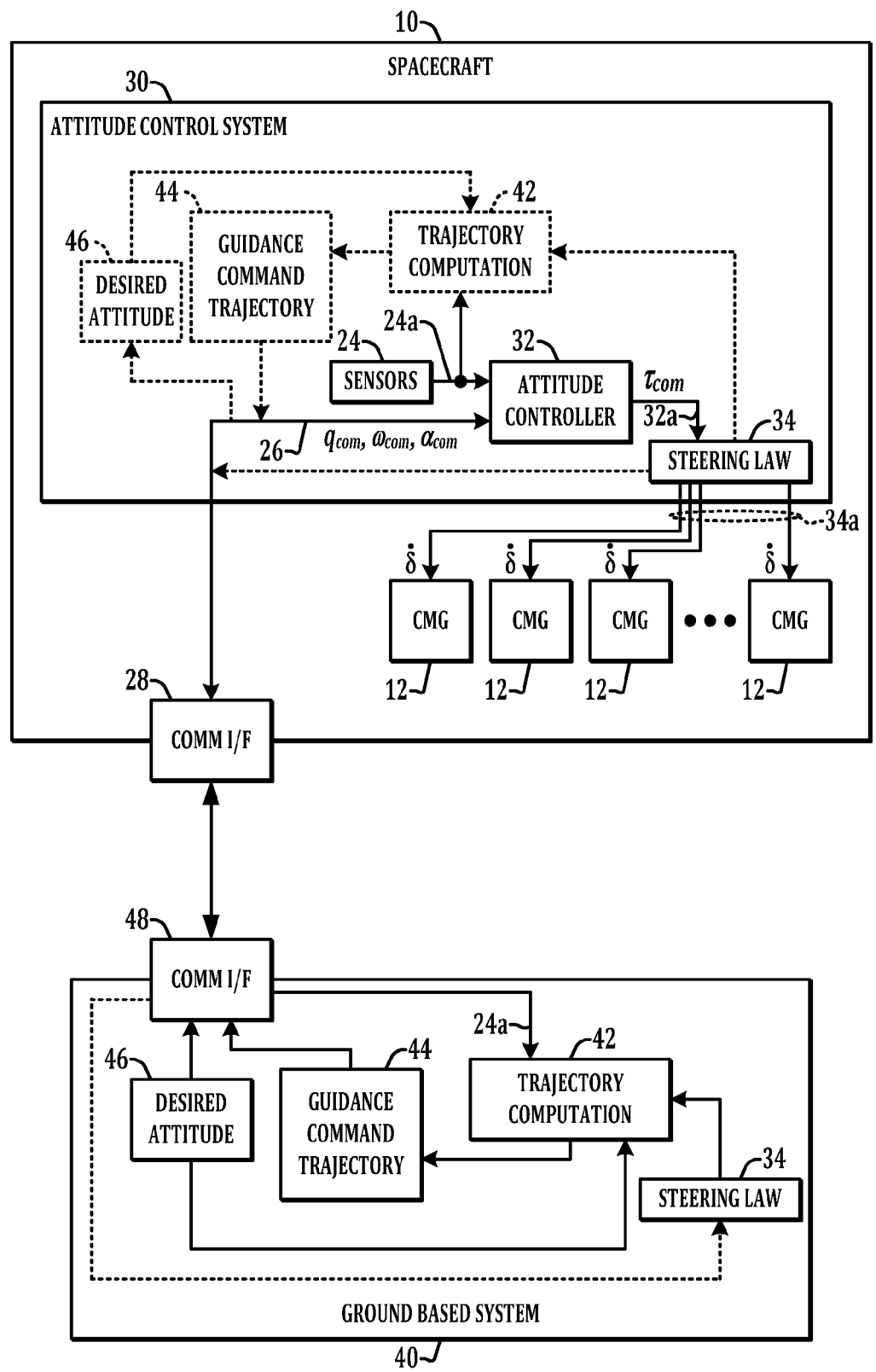
FIG. 4 is a system diagram illustrating an exemplary spacecraft with an attitude control system having an onboard guidance command trajectory computation component as well is a ground-based system having a guidance command trajectory computation component in accordance with one or more aspects of the present disclosure.

As seen in FIG. 4, the spacecraft 10 also includes one or more sensors 24 providing sensor output signals or values 24a to the attitude controller 32, for example, to indicate the measured spacecraft angular positions and changes therein. For instance, the sensors 24 may be disposed at various locations on the spacecraft 10 in order to provide signals and/or values indicative of the spacecraft orientation or attitude in the form of a vector ($q=[q_1, q_2, q_3, q_4]^T$), as well as the spacecraft angular rate in the form of a vector ($\omega=[\omega_1, \omega_2, \omega_3]^T$), where the orientation and rate vectors q and w each include a plurality of associated values corresponding to a number of axes in a given coordinate system. In the illustrated embodiments, for example, the attitude control system 30 operates according to a quaternion representation of orientation or attitude, which is a four-dimensional representation of the orientation angles. Likewise, the rate vector ω is also represented in one embodiment as having three values $\omega_1, \omega_2$, and $\omega_3$, although not a strict requirement of all possible implementations of the present disclosure. For example, other coordinate system representations may be used, e.g. Euler angles, which will typically be three-dimensional or other representations of possibly higher dimensions. Spacecraft 10 is equipped with a communications interface 28 allowing communication with a ground-based system 40 having a similar interface 48. In one possible configuration, the ground-based system 40 is a processor-based apparatus that provides a desired quaternion orientation as an input vector $q_{com}$, and/or a desired rate vector $\omega_{com}$, and/or a desired acceleration vector a $\alpha_{com}$ 26 to the attitude controller 32, with the attitude controller 32 determining an error vector representing the difference between the current spacecraft position and/or rate vector(s) 24a and the desired vector(s) 26. The attitude controller 32 in general operates in closed-loop fashion to minimize this error by providing a torque command vector 32a to the steering law 34 for generation of the gimbal angle rate signals or values 34a provided to the CMGs 12. In this manner, an operator (or system) on the ground may provide a desired command to cause the attitude control system 30 to readjust the attitude of the spacecraft 10.

Either or both of the spacecraft 10 and the ground-based system 40 may include apparatus for guiding the spacecraft 10 by providing a time-varying command vector 44 (a guidance command trajectory) as a guidance command input 26 to the attitude controller 32 of the spacecraft 10. As seen in FIG. 4, the ground-based system 40 and/or the onboard attitude control system 30 may thus be provided with a trajectory computation component 42 which generates the time-varying command vector 44 based in whole or in part on a desired attitude or orientation 46. In this regard, certain implementations may involve the ground-based system 40 providing the desired final spacecraft orientation or attitude (e.g., a four dimensional quaternion vector and/or three dimensional rate vector) 46 to the spacecraft 10 via the communications interfaces 48, 28, with the spacecraft-based trajectory computation component 42 using this and the initial spacecraft state from the sensor signals or values 24a to generate the guidance command trajectory 44 for provision to the attitude controller 32. In another possible implementation, the ground-based system 40 employs a local processor-based trajectory computation component 42 to generate the attitude trajectories 44 based on the desired attitude vector 46 as well as on sensor output signals or values 24a received from the spacecraft 10 through the communications interfaces 28, 48 in order to compute the guidance command trajectory 44 for subsequent transmission to the spacecraft 10 via the interfaces 28, 48. As discussed further below, moreover, the trajectory computation components 42 of the spacecraft 10 and/or of the ground based system 40 also employ or include the steering law 34 in computing the guidance command trajectory 44. In this regard, the communications interface 28, 48 may be used in certain embodiments to transmit information about the steering law 34 from the spacecraft 10 to the ground-based system 40 for use by the ground a profile computation component 42 in providing the guidance command trajectory 44 for transmission from the ground-based system to spacecraft 10 for use by the attitude controller 32. Alternatively, a spacecraft-based profile computation component 42 may directly obtain information regarding the steering law 34 used in connection with the attitude controller 32, and use the information about the steering law 34 in combination with the desired attitude 46 and computing the guidance command trajectory 44 to be used as an input to the attitude controller 32. As noted, various embodiments can be used in which the desired attitude 46 is generated locally at the spacecraft 10 and/or the desired attitude 46 may be provided from the ground-based system 40 to spacecraft 10 via the communications interfaces 28 and 48.

Figure 5:
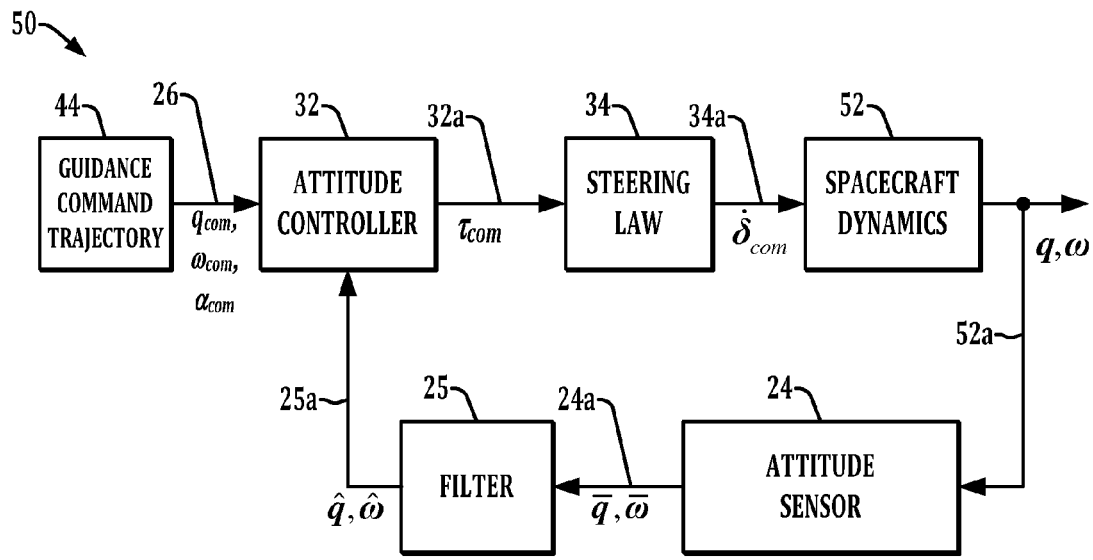
FIG. 5 is a control diagram illustrating a closed loop spacecraft attitude control system receiving an input guidance command trajectory from an onboard or ground-based profile computation component.

FIG. 5 illustrates a block diagram 50 showing operation of the attitude control system 30 in closed loop form using the time-varying attitude command vector 44 as a time-varying setpoint input 26 to the attitude controller 32. The attitude controller 32 compares the desired command vector 26 to one or more feedback vectors obtained from the attitude sensors 24 through a filter 25. In operation, the attitude controller 32 compares the current orientation of the spacecraft 10 received by way of a feedback vector 25a from the filter 25 representing a filtered output from the attitude sensor signals or values 24a, with the desired attitude and/or the derivative of the desired attitude 26. As seen in FIG. 5, the current spacecraft state may be in terms of angular positions "q" and/or may be represented as angular speeds "ω", or the system may operate according to angular acceleration values (not shown) or any combinations thereof. The diagram 50 of FIG. 5 includes the steering law 34 receiving the three, typically orthogonal, control torques ($T_{com}$) as a vector 32a from the attitude controller 32, with the steering law 34 in certain embodiments determining how the commanded control torques can be generated by steering the CMG array 12 in a way that attempts to avoid singular states. The spacecraft dynamics 52 in FIG. 5 represent operation of the CMG array 12 as well as any other physical characteristics of the spacecraft (e.g., center of gravity, etc.), where the attitude sensors 24 sense the dynamic output 52a of the spacecraft dynamics 52 (in terms of an angle vector q, an angle rate vector ω, an angle acceleration value, etc). In the illustrated embodiment, for example, the attitude sensor 24 may be an array of sensors (not shown) operative to measure the angular rate of the spacecraft rotation and to use this information to compute the spacecraft attitude. The filter 25 advantageously operates to smooth out the raw sensor data 24a, and may be omitted in certain implementations.

Figure 6:
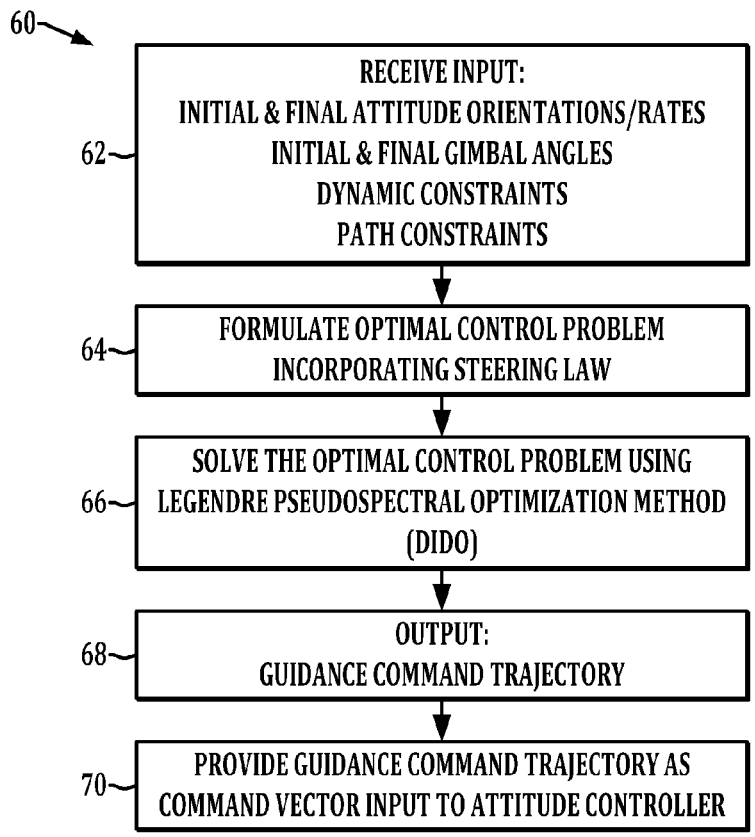
FIG. 6 is a flow diagram illustrating an exemplary method for guiding a spacecraft in accordance with further aspects of the disclosure.

FIG. 6 illustrates an exemplary process or method 60 for guiding a spacecraft 10 from an initial state to a final state (e.g., from the initial state facing a reference point 2 to a final state facing a reference point 4 in FIG. 1 above) using an array of CMGs 12. The illustrated process 60, in practice, may be advantageously employed to mitigate or avoid CMG singularity problems, even in the presence of loss of one or more CMGs 12, thereby additionally providing contingency operation, although singularity avoidance is optional and need not be provided by all embodiments of the present disclosure. Although the illustrated process 60 and other methods of the present disclosure are depicted and described in the form of a series of acts or events, it will be appreciated that the various methods of the disclosure are not limited by the illustrated ordering of such acts or events except as specifically set forth herein. Except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, processor-executed software, or combinations thereof, in order to provide spacecraft guidance functions as described herein, and various embodiments or implementations include non-transitory computer readable mediums having computer-executable instructions for performing the illustrated and described methods. For instance, the method 60 may be performed in the attitude control system 30 of the spacecraft 10 and/or via a processor of the ground-based system 40 to implement the guidance command trajectory computation concepts disclosed herein.

Figure 7:
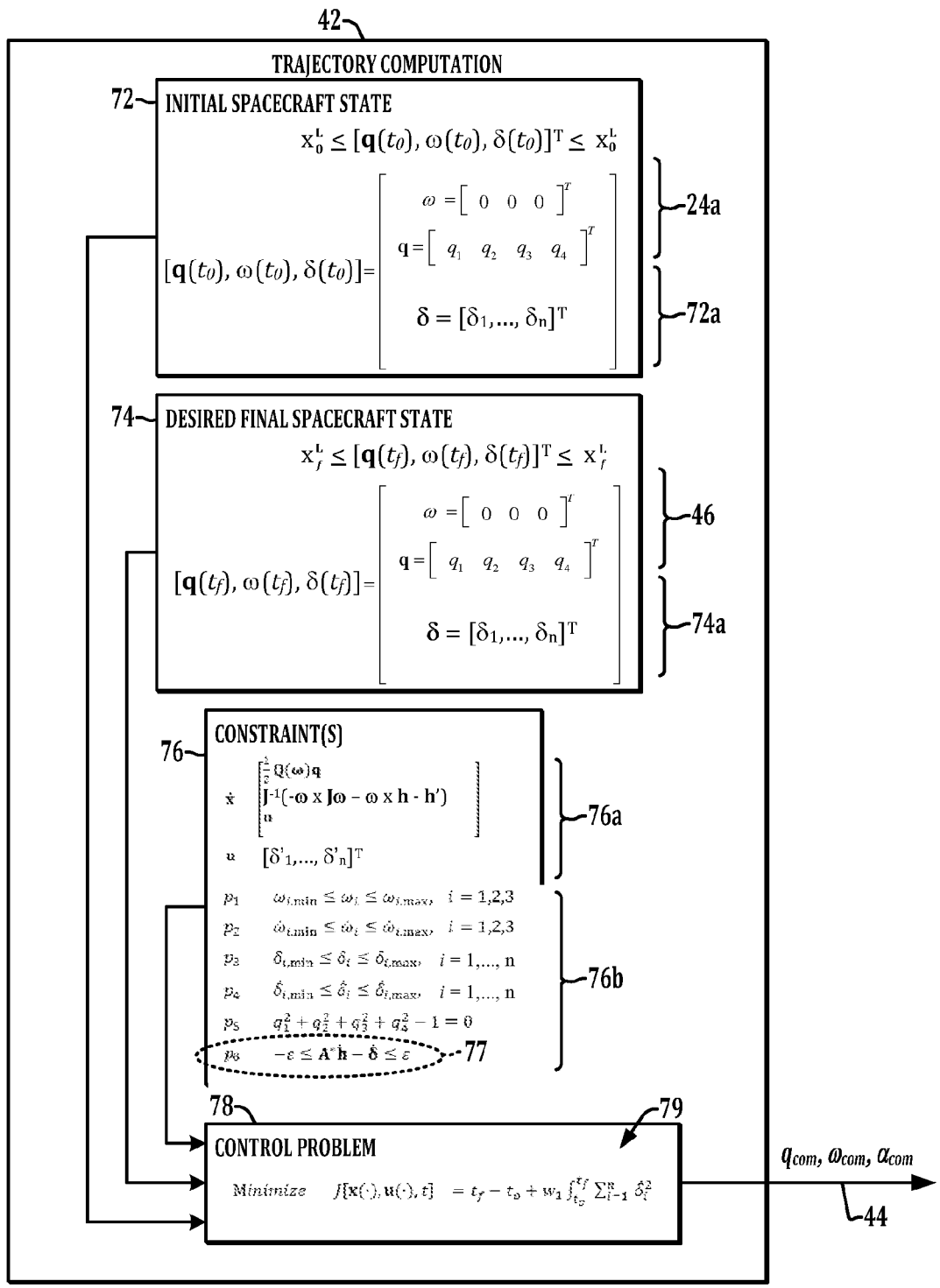
FIG. 7 is a schematic diagram illustrating further details of the trajectory computation component with a formulated optimal control problem incorporating a steering law or control law as a path constraint.
Figure 8:
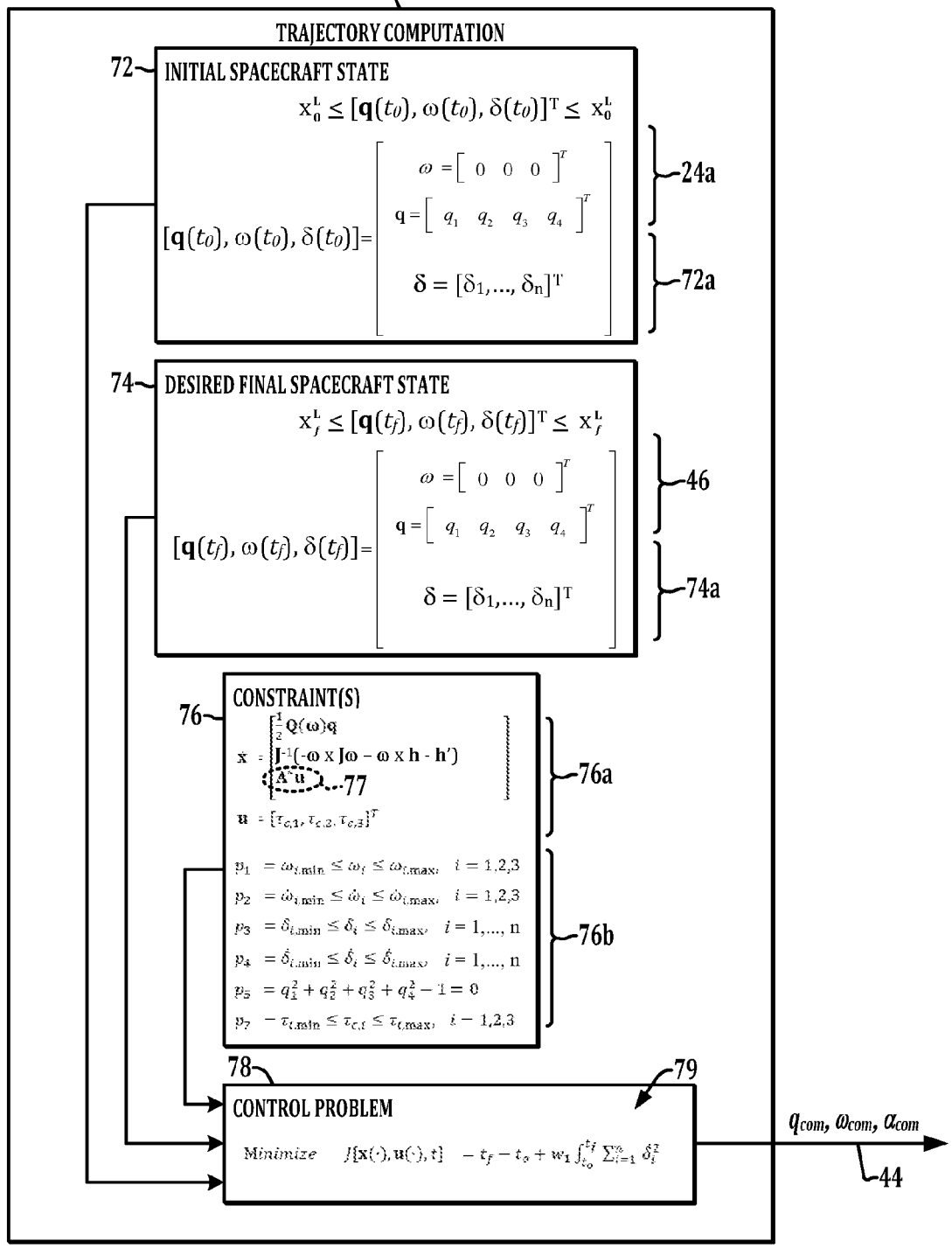
FIG. 8 is a schematic diagram illustrating another trajectory computation component embodiment with a formulated optimal control problem incorporating a steering law or control law as a dynamic constraint.

Referring now to FIGS. 6-8, method 60 begins at 62 in FIG. 6, with the trajectory computation component 42 receiving an initial spacecraft state 72, which may be derived in whole or in part, directly and/or indirectly (e.g., through the filter 25 in FIG. 5) from the attitude sensor output signals or values 24a, which may also include feedback from the array of CMGs 12. In particular, the initial spacecraft state 72 in FIG. 7 includes an initial spacecraft attitude vector 24a ($q=[q_1, q_2, q_3, q_4]^T$), an initial spacecraft rate vector 24a ($\omega=[\omega_1, \omega_2, \omega_3]^T$), and an initial CMG angle vector 72a ($\delta=[\delta_1, \ldots, \delta_n]^T$). The trajectory computation component 42, moreover, receives a desired final spacecraft state 74 at 62 in FIG. 6, which defines the desired final spacecraft attitude vector 46 ($q=[q_1, q_2, q_3, q_4]^T$), a desired final spacecraft rate vector 46 ($\omega=[\omega_1, \omega_2, \omega_3]^T$), and a desired final CMG angle vector 74a ($\delta=[\delta_1, \ldots, \delta_n]^T$). As mentioned above, the desired final spacecraft state 74 may be provided, in whole or in part, directly and/or indirectly, from the ground-based system 40 (e.g., desired attitude 46 in FIG. 4 above) and/or the final state 74 may be generated on board the spacecraft 10. In the illustrated implementation, the attitude vector is four dimensional due to the preferred use of a quaternion attitude representation, and the rate and CMG vectors 72a and 74a are each three dimensional and four dimensional vectors respectively, although the various concepts of present disclosure are not limited to the specific examples, and the initial and desired final states 72 and 74 may be defined and/or represented in terms of vectors of different (e.g., higher and/or lower) orders than the illustrated implementations. The inputs thus define the desired spacecraft attitude orientations as well as the spacecraft angular rates at the beginning and end of the maneuver, and may also include initial and final CMG states in certain implementations, e.g., gimbal angles, gimbal rates and/or gimbal accelerations. Any number of different inputs can be provided allowing configuration for various different maneuvers including contingency maneuvers, without modifying the onboard attitude control law or the onboard steering law 34 used by the attitude control system 30.

The trajectory computation component 42, moreover, receives one or more constraints 76 at 62, which may include one or both of dynamic constraints 76a as well as path constraints 76b. In various embodiments, the component 42 receives at least one constraint 76 that defines desired limitations with respect to spacecraft attitude, spacecraft motion, and/or CMG operation. In addition, the input data received at 62 by the computation component 42 includes at least one steering law constraint 77 (e.g., FIGS. 7 and 8 below) based at least partially on the steering law 34 used in operating the spacecraft 10. In the example of FIG. 7, the profile computation component 42 receives initial and final spacecraft state information 72 and 74, respectively, as well as dynamic constraints 76a and path constraints 76b, where the path constraints in this example include the steering law constraint 77 (indicated as $p_6$ in this example). FIG. 8 illustrates another possible embodiment in which the steering law constraint 77 is included as a dynamic constraint 76a. As described further below the trajectory computation component 42 formulates and solves a control problem 78 using the control or steering law constraint 77 (e.g., as a path constraint or as a dynamic constraint) in order to provide the guidance command trajectory 44 for use in operating the CMGs 12 to guide the spacecraft 10 from the initial state 72 to the desired final state 74. The inventors have appreciated that incorporation of the steering law constraint 77 in the control problem formulation advantageously facilitates controlled operation of the spacecraft 10 during maneuvers, for example, to avoid or mitigate transitions outside of the other dynamic and/or path constraints 76 when the spacecraft 10 is operated in closed-loop fashion.

The computation component 42 in these examples utilizes dynamic constraints 76a regarding the time derivative of the spacecraft state vector (x'). An example of the spacecraft dynamics includes an equation describing the spacecraft acceleration that is affected by the spacecraft inertia (J), and vectors representing angular rate $\omega$, CMG momentum (h) and the time derivative thereof (h'). In addition, the evolution of the spacecraft state vector (x) can be characterized in terms of kinematic differential equations comprising a skew symmetric matrix $Q(\omega)$ whose elements are a function of the angle rate $\omega$, and further with respect to the first time derivative of the gimbal angle $\delta$ and further, in certain embodiments, with respect to the second time derivative of the gimbal angle $\delta$. The constraints 76, in this regard, may be dynamically adjusted as needed by any process operator, at the spacecraft 10 and/or by the ground-based system 40, or the constraints 76 may be updated with each usage of the trajectory computation component 42. As seen in FIG. 7, moreover, certain embodiments provide at least one path constraint 76b limiting the norm of the spacecraft attitude vector ($q=[q_1, q_2, q_3, q_4]^T$), and/or one or more box constraints defining limits ($\omega_{min}$, $\omega_{max}$) on the values of spacecraft angle rates ($\omega_i$) of the spacecraft rate vector 46 ($\omega=[\omega_1, \omega_2, \omega_3]^T$), and/or one or more box constraints on the spacecraft acceleration or higher motion derivatives, and/or a box constraint defining limits ($\delta'_{min}$, $\delta'_{max}$) on the values of each CMG gimbal rate $\delta'_i$ of the CMG angle rate vector 74a ($\delta'=[\delta'_1, \ldots, \delta'_n]^T$) and/or a box constraint defining limits ($\delta''_{min}$, $\delta''_{max}$) on the absolute value of each CMG gimbal acceleration $\delta''_i$ (not shown in FIG. 7).

The input data 72, 74, 76, 77 received by the profile computation component 42 thus describes the state of the spacecraft 10 at the beginning of the maneuver as well as the spacecraft state at the end of the maneuver, in addition to constraints that must be satisfied during the maneuver and the steering law constraint 77. In one possible implementation, a set of inputs can be provided at 62 in a vector form including the spacecraft state 72 at the beginning of one possible reorientation maneuver (FIGS. 7 and 8). In these examples, the spacecraft 10 starts from rest, i.e. with the spacecraft angular rates or speed set to zero ($\omega=[0, 0, 0]^T$), and with the attitude described by the quaternion vector $q=[q_1, q_2, q_3, q_4]^T$. In this implementation, moreover, the initial configuration of the CMG array 12 is specified by vector $\delta=[\delta_1, \ldots, \delta_n]^T$. In addition, the desired final state 74 describes the desired state of the spacecraft 10 at the end of the maneuver. A guidance command trajectory 44 is obtained for each maneuver that is to be performed as the solution to the optimal control problem 78 in these examples. In the illustrated embodiment, the objective function "J[x(*), u(*), t]", also referred to as the cost function, is the overall maneuver time, $t_f - t_o$, with an adjustable weighted factor taking into account the maneuver energy expenditure $w_1 \int_{t_o}^{t_f} \Sigma_{i=1}^n \dot{\delta}_i^2$. In this example, with the weighting factor $w_1$ set to 0, the objective function is strictly in terms of the total maneuver time, and thus the solution to the control problem can be used to implement a shortest-time maneuver (STM). In other possible embodiments, the objective function can be strictly in terms of the maneuver energy expenditure, or the illustrated example can be used with a non-zero weighting factor $w_1$ such that the selected guidance command attitude profile 44 advantageously reduces both the maneuver time and a model of the maneuver energy expenditure. In addition, the model of the spacecraft dynamics (x') is given by standard equations in these examples, well known to those of ordinary skill in the art. The spacecraft attitude is described using quaternions, and the dynamics of the CMG gimbals 12 in this example are described using a simple single or double integrator model. In other embodiments, alternative models of the dynamics of the CMG gimbals could be utilized. The system states in this example are satellite angular rates, and the quaternions, and the CMG gimbal angles. The control variables are CMG gimbal rates. In other embodiments, the CMG gimbal rates may be taken as part of the system state and the CMG gimbal accelerations, or the desired CMG gimbal torques or CMG gimbal currents may be selected as the control variables. In the illustrated implementations, a path constraint on the norm of the quaternion vector is specified, and box constraints are imposed on the allowable CMG gimbal rates and on the allowable CMG gimbal angles. Path constraints 76b on the satellite angular rates can also be specified as shown at 76 in FIGS. 7 and 8 and/or path constraints on the satellite angular accelerations (not shown) can also be specified.

At 64 in FIG. 6, the trajectory computation component 42 formulates a control problem (e.g., an optimal control problem 78 as shown in FIGS. 7 and 8) at least partially according to the input data 72, 74, 76, 77, including or incorporating the steering law 34, such as by consideration of the steering law constraint 77. In the example of FIG. 7, the component 42 constructs an objective function or cost function 79 ($J[x(\cdot), u(\cdot), t] = t_f - t_o + w_1 \int_{t_o}^{t_f} \Sigma_{i=1}^n \dot{\delta}_i^2$) that includes a spacecraft system state x(*) defined by the spacecraft attitude vector ($q=[q_1, q_2, q_3, q_4]^T$), the spacecraft rate vector ($\omega=[\omega_1, \omega_2, \omega_3]^T$), and the CMG angle vector ($\delta=[\delta_1, \ldots, \delta_n]^T$), as well as a control variable vector u representing CMG gimbal rates ($\delta'=[\delta'_1, \ldots, \delta'_n]^T$) where, the objective function is constructed in terms of overall maneuver time ($t_f - t_o$) and the maneuver energy expenditure is modeled as $w_1 \int_{t_o}^{t_f} \Sigma_{i=1}^n \dot{\delta}_i^2$. Different embodiments are possible with the computation component 42 formulating any suitable type of control problem 78 for which a solution provides time-varying signals or values (e.g., time-histories) of the spacecraft attitude and other internal states, including without limitation, spacecraft angular velocities, gimbal angles, gimbal rates, gimbal accelerations, etc.

The time-varying attitude command signals or values provided as part of the guidance command trajectory 44 in certain embodiments correspond to a spacecraft maneuver that enables the specifications on the initial and final spacecraft states and CMG configuration to be met within a predetermined tolerance. The optimal control problem 78 in this example, moreover, is solved by the trajectory computation component 42 to minimize or maximize a mathematical objective function related to some aspect of the spacecraft performance, such as minimizing or reducing the overall maneuver time $(t_f-t_o)$ (e.g., Minimize $J[x(*), u(*), t]=(t_f-t_o)$) alone or in combination with minimizing or reducing the maneuver energy expenditure. Moreover, an objective function to be optimized need not be specified in all embodiments, and other implementations are contemplated in which a solution to an optimal control problem formulation may be used that enables the specifications on the initial and final spacecraft states and CMG array configuration to be satisfied without regard to a particular objective function. The control problem formulation 78 may also provide a mathematical specification of the nominal and/or failed spacecraft dynamics, which can be a model having any arbitrary fidelity as selected by an operator or other user. The use of the dynamics model in certain embodiments helps to ensure that the solved maneuver trajectory, i.e. the solution to the control problem, will cause the spacecraft to successfully perform the maneuver with respect to the governing physics. As seen in FIGS. 7 and 8, the optimal control problem formulation 78 can additionally include mathematical specifications that constrain the operation of the spacecraft to predefined bounds, such as an inequality that constrains the spacecraft angular rate to be above or below certain values, or other constraints with respect to CMG gimbal angles, gimbal rates, and/or gimbal accelerations can also be defined as part of the optimal control problem formulation at 64.

The control problem 78 is then solved at 66 in FIG. 6 in order to provide the time-varying guidance command vector 44 comprising $q_{com}=[q_1, q_2, q_3, q_4]^T$ and/or $\omega_{com}=[\omega_1, \omega_2, \omega_3]^T$ and/or $\alpha_{com}=[\alpha_1, \alpha_2, \alpha_3]^T$ which includes a plurality of time-varying attitude command signals or values 26 representing a plurality of spacecraft states and control trajectories with respect to spacecraft angles q and/or spacecraft angle rates ω and/or spacecraft angle accelerations α. In the illustrated implementations, moreover, the control problem 78 is solved at 66 using at least one processor of the spacecraft 10 and/or of the ground based system 40 by minimizing the overall maneuver time $(t_f-t_o)$ or minimizing the maneuver energy expenditure or by minimizing or at least reducing a summation of these factors (e.g., $t_f-t_o+w_1\int_{t_o}^{t_f}\Sigma_{i=1}^n\dot{\delta}_i^2$). In one possible implementation, the control problem 78 can be solved by a programmed processor via the Legendre Pseudospectral optimal control technique, although other embodiments could also be applied to perform the control problem solution at 66, including without limitation genetic algorithms, neural networks, potential field methods, inverse methods, shooting, multiple shooting or collocation. As a result of the optimal control problem solution at 66, the time-varying attitude command signals or values 26 are provided, for example, as a set of state and control trajectories that describe the time-evolution of the spacecraft attitude and other internal states over the time interval between the beginning and end of the maneuver (e.g., between $t_o$ and $t_f$). In one possible implementation, only the attitude profile 44 (e.g. $q_{com}$) may be used as the guidance command 26, but time-derivatives of the attitude profile 44 (e.g $\omega_{com}$ and/or $\alpha_{com}$) could also be used to drive the attitude controller in other possible alternative embodiments.

At 70 in FIG. 6, the time-varying attitude command vector 44 is provided as a guidance command input 26 to the spacecraft attitude controller 32 (FIGS. 4 and 5). One possible implementation provides the trajectory computation component 42 at a ground based system 40 (e.g., FIG. 4 above), with the ground-based system 40 providing the guidance command trajectory 44 via the communications interfaces 48 and 28 without any further modification to the spacecraft 10. Alternatively, as seen in FIG. 4, the trajectory computation component 42 may be implemented in a processor-based system of the spacecraft 10. The attitude controller of FIGS. 4 and 5 compares the current measured spacecraft orientation and/or the time-derivatives of the spacecraft motion to the time-varying attitude command vectors 26 comprising $q_{com}$ and/or $\omega_{com}$ and/or $\alpha_{com}$. Attitude profiles 44 are used as an input to any conventional attitude controller 32 in order to generate a vector of time-varying control torque signals that are subsequently processed by the steering law 34 to reorient the spacecraft 10 between any arbitrary initial attitude 72 to any arbitrary final attitude 74. The output of the steering law 34 accordingly provides a vector of time varying gimbal rate commands 34a that are used to drive the individual CMG gimbals 12. In other possible nonlimiting implementations, the output of the steering law 34 could be a vector of gimbal angles, gimbal accelerations, gimbal torques, or gimbal currents depending on the control architecture that is implemented as part of the spacecraft attitude control system 30. The resulting motion of the CMG gimbals 12 causes a torque to be applied to the spacecraft body 10 that, in turn, enables the spacecraft 10 to be rotated or otherwise repositioned.

As previously noted, shortest-time maneuvering advantageously allows maximization of data collection and/or revenue for satellite operators by reducing slew time which, in turn, increases the capacity of the system. To take advantage of this capability while ensuring safe and proper satellite operation, it is important to ensure consistent evolution of the spacecraft internal states when STMs are executed on the spacecraft 10 to avoid violating hardware or other mission constraints. The present disclosure provides a novel maneuver computation technique which can be employed for designing STMs or other maneuvers (e.g., lowest energy maneuvers) with consistent internal states by accounting for the dynamics and/or control allocation characteristics of a given steering law 34 in the formulation of the optimal control problem used to generate the guidance command trajectory 44. In particular, the inventors have appreciated that this novel approach addresses some of the inherent complexities of CMG systems directly, as part of the maneuver design process by integrating one or more CMG steering law as part of the optimal control problem formulation. This, in turn, facilitates reliable implementation of STMs using existing or heritage closed-loop attitude control architectures without requiring modification of spacecraft attitude control system 30 or steering law 34 itself. Embedding the CMG steering logic as part of the optimal control also enables the design of singularity robust time-optimal maneuvers that can be successfully implemented using a closed-loop attitude control system 30.

Referring also to FIGS. 9-12, several exemplary implementations are hereinafter illustrated and described. In the following, a highly maneuverable control moment gyroscope (CMG) spacecraft testbed system is described which allows +/−45° of rotation about the pitch and roll (horizontal) axes and unconstrained rotation about the yaw (vertical) axis. This setup provides a large envelope over which a wide variety of attitude maneuvers can be demonstrated in a ground based laboratory environment. A typical scenario is a rapid image acquisition operation, which is emulated in the test environment using a low-cost CCD camera. For primary attitude control, the testbed uses four CMGs 12 arranged in a standard pyramidal array, with a CMG pyramid skew angle of β=54.7°. The testbed also has a multi-axis cold gas reaction control system (RCS) that can be used for desaturating the CMG array 12 or for simulating various torque disturbances. Onboard attitude control and telemetry processing is done using a computer, with a wireless link used to communicate with a ground terminal. In this exemplary system, attitude is constructed from the outputs of three orthogonally mounted gyros and a magnetometer/accelerometer unit, and additional instrumentation is available to monitor CMG power consumption, as well as the state of the CMG array 12 including CMG wheel rates and gimbal positions, rates and accelerations. The system can be mathematically modeled by considering the equations of motion of a rigid body spacecraft actuated by an array of momentum exchange devices. The testbed has a mass-balance mechanism that can be tuned to align the simulator center of rotation with the system center of mass. Thus, the system can be nominally operated in the absence of external gravity torques to emulate gravity free space environment. In this case, the standard equation expressing the rotational dynamics of the CMG spacecraft is obtained, as shown in the following equation (1).

$$J\dot{\omega} + \omega \times J\omega + \omega \times h + \dot{h} = 0 \tag{1}$$

Figure 9:
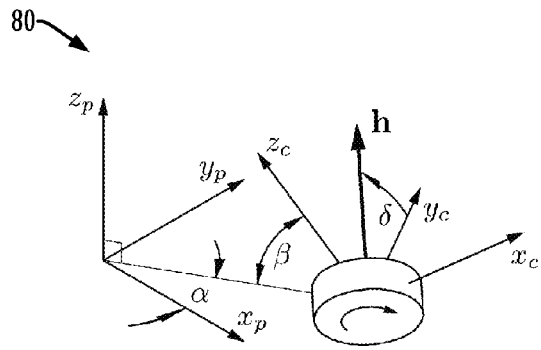
FIG. 9 is a perspective view illustrating an exemplary CMG momentum vector in relation to a fixed reference frame.

FIG. 9 provides a view 80 of a momentum vector h of a CMG 12 in relation to a fixed reference frame p where, the individual CMG momentum vectors $h_i$ can be expressed with respect to a fixed reference frame p through a transformation of the form according to the following equation (2):

$$h_i = J_{s,i}\Omega_i \begin{bmatrix} -\cos(\alpha_i)\cos(\beta)\sin(\delta_i) - \sin(\alpha)\cos(\delta_i) \\ -\sin(\alpha_i)\cos(\beta)\sin(\delta_i) + \cos(\alpha)\cos(\delta_i) \\ \sin(\beta)\sin(\delta_i) \end{bmatrix} \tag{2}$$

where $J_s$ is the rotor inertia about the spin axis and $\Omega$ is the rotor spin rate. Angles $\alpha$ and $\beta$ denote the base circle spacing angle and the fixed pyramid skew angle, respectively.

Figure 10:
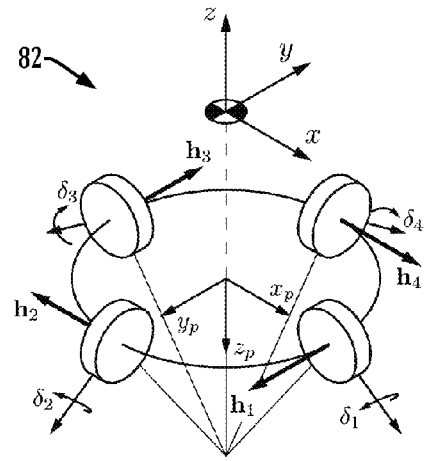
FIG. 10 is a perspective view illustrating an exemplary configuration of multiple CMGs in an apex down orientation.

FIG. 10 provides a view 82 showing an exemplary CMG configuration for the testbed, in which the CMG pyramid is rotated with respect to the spacecraft frame to form an apex down arrangement. Thus, the CMG angular momentum vector may be expressed in the body fixed frame according to the following equation (3):

$$h = R_p \sum_{i=1}^{4} h_i \tag{3}$$

where $R_p$ is a rotation matrix relating the CMG pyramid frame p to the body frame and $h_i$ are the individual CMG angular momenta expressed in the pyramid frame p. In this case, the torques acting on the spacecraft body are given by the following equation (4):

$$\dot{h} = R_p \sum_{i=1}^{4} \dot{h}_i = R_p A(\delta)\dot{\delta} \tag{4}$$

where the columns of matrix $A(\delta)=[a_1(\delta_1)|a_2(\delta_2)|a_3(\delta_3)|a_4(\delta_4)]$ are obtained by differentiating the individual CMG momentum vectors with respect to time and separating the resulting $\dot{\delta}$ terms. For example, differentiating equation (2) and omitting the $\dot{\delta}$ terms yields the following equation (5).

$$a_i = J_{s,i}\Omega_i \begin{bmatrix} -\cos(\alpha_i)\cos(\beta)\cos(\delta_i) + \sin(\alpha_i)\sin(\delta_i) \\ -\sin(\alpha_i)\cos(\beta)\cos(\delta_i) - \cos(\alpha_i)\sin(\delta_i) \\ \sin(\beta)\cos(\delta_i) \end{bmatrix} \tag{5}$$

Using the above definitions for the CMG angular momentum vector and its time derivative, the Newton-Euler equations can be rewritten as a vector of first-order differential equations according to the following equation (6).

$$\dot{\omega} = J^{-1}\left[-\omega \times J\omega - \omega \times R_p \sum_{i=1}^{4} h_i - R_p A(\delta)\dot{\delta}\right] \tag{6}$$

To complete the mathematical model of the spacecraft dynamics, the differential equations for the attitude kinematics can be defined, where the spacecraft attitude is modeled using quaternions parameterized according to the following equation (7):

$$q = [e_1 \sin(\Phi/2), e_2 \sin(\Phi/2), e_3 \sin(\Phi/2), \cos(\Phi/2)]^T \tag{7}$$

where $e=[e_1, e_2, e_3]$ is the Euler vector (Eigen axis) and $\Phi$ is the rotation angle around the Eigen axis. The following equation (8) shows the corresponding quaternion differential equation:

$$\dot{q} = \frac{1}{2}Q(\omega)q \tag{8}$$

where the skew-symmetric matrix $Q(\omega)$ is given by the following equation (9):

$$Q(\omega) = \begin{bmatrix} 0 & \omega_3 & -\omega_2 & \omega_1 \\ -\omega_3 & 0 & \omega_1 & \omega_2 \\ \omega_2 & -\omega_1 & 0 & \omega_3 \\ -\omega_1 & -\omega_2 & -\omega_3 & 0 \end{bmatrix} \tag{9}$$

Referring again to FIGS. 4 and 5, given an attitude command 26, the attitude controller 32 (FIG. 5) computes a trajectory of torque commands 32a ($\tau_{com}$) (see FIG. 4) that drives the attitude error to zero. The actual torques $\tau$ are generated by the CMG array 12 as a results of gimballing the CMGs 12 at the desired CMG gimbal rates $\dot{\delta}_{com}$ 34a (see FIG. 4). A common attitude control law is the quaternion feedback control logic. When the attitude command 44 in this example is specified in terms of quaternions, $q_c=[q_{1c}, q_{2c}, q_{3c}, q_{4c}]^T$, the spacecraft control torques, $\tau_c$, can be computed according to the following equation (10).

$$\tau_c = -Ke_q - C_{\omega + \omega \times}(J\omega + h) \tag{10}$$

The attitude error vector, $e_q=[q_{1e}, q_{2e}, q_{3e}]^T$ is obtained by the following equation (11).

$$\begin{bmatrix} q_{1e} \\ q_{2e} \\ q_{3e} \\ q_{4e} \end{bmatrix} = \begin{bmatrix} q_{4c} & q_{3c} & -q_{2c} & -q_{1c} \\ -q_{3c} & q_{4c} & q_{1c} & -q_{2c} \\ q_{2c} & -q_{1c} & q_{4c} & -q_{3c} \\ q_{1c} & q_{2c} & q_{3c} & q_{4c} \end{bmatrix} \begin{bmatrix} -q_1 \\ -q_2 \\ -q_3 \\ q_4 \end{bmatrix} \tag{11}$$

In equation (10), the action of gain matrices K and C can be interpreted as a proportional and derivative control, and the gain matrices K and C can be constructed using any suitable techniques as are known to those of ordinary skill in the art. In another embodiment, the spacecraft control torques can be computed according to the following equation (11a).

$$\tau_c = -Ke_q - C(\omega_{com} - \omega) + \omega \times (J\omega + h) \quad (11a)$$

Or, in another embodiment, the spacecraft control torques can be computed according to the following equation (11b).

$$\tau_c = -Ke_q - C(\omega_{com} - \omega) - D\alpha_{com} + \omega \times (J\omega + h) \quad (11b)$$

In equation (11b), gain matrix D is interpreted as an acceleration feedforward gain matrix. The CMG steering law 34 allocates the computed torque command 32a among the individual CMGs 12, and determines the appropriate gimbal rate commands $\dot{\delta}_c$ (34a) for generating the commanded torque $\tau_c$. Besides serving as a mechanism for control allocation, the CMG steering law 34 may also, by design, advantageously avoid or mitigate the occurrence of singular states. One common CMG steering law 34 that may be employed is the singularity robust inverse logic in which the gimbal rate commands are obtained according to the following equation (12):

$$\dot{\delta}_c = A^T[AA^T + \lambda I]^{-1}\tau_c \quad (12)$$

where I is the identity matrix and $\lambda$ is a small positive constant. Note that if $\lambda = 0$, equation (12) reduces to the Moore-Penrose pseudoinverse.

Figure 11:
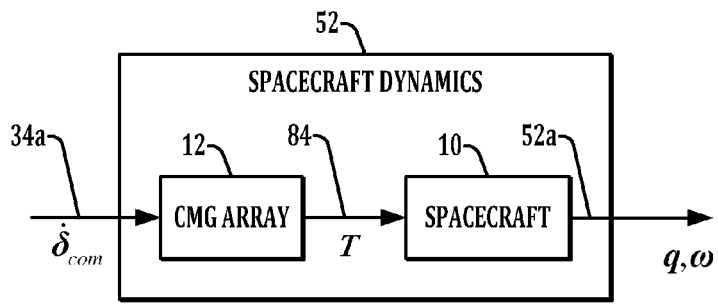
FIG. 11 is a simplified system diagram illustrating an open-loop spacecraft model.

FIG. 11 illustrates an open-loop spacecraft model, in which the spacecraft dynamics 52 (FIG. 5 above) is seen to include those of CMG array 12 as well as those of the spacecraft 10. A shortest-time maneuver problem can be solved as an optimal control problem using the open-loop spacecraft model shown in FIG. 11, where the optimal control problem formulation is given by the following equation (13), wherein the cost function is minimized to provide a minimal maneuver time (to minimize the final time $t_f$) in one example.

$$(STM) \quad (13)$$

$$\begin{cases} \text{Minimize} & J[x(\cdot), u(\cdot), t] = t_f \\ \text{Subject to} & \dot{x}(t) = f(x, u, t) \\ & x_0 = \left[e_0 \sin\left(\frac{\Phi_0}{2}\right), \cos\left(\frac{\Phi_0}{2}\right), \omega_0, \delta_0\right]^T \\ & x_f = \left[e_f \sin\left(\frac{\Phi_f}{2}\right), \cos\left(\frac{\Phi_f}{2}\right), \omega_f, \delta_f\right]^T \\ & p(x, u, t) \leq 0 \end{cases}$$

The solution to the optimal control problem in (13) above gives the state-control function pair, $t \rightarrow (x,u)$, where the control variable $u = \dot{\delta}_c$ that drives the spacecraft from its initial orientation 72 ($q_0 = [e_0 \sin(\Phi_0/2), \cos(\Phi_0/2)]^T$) to the desired final attitude 74 ($q_f = [e_f \sin(\Phi_f/2), \cos(\Phi_f/2)]^T$) in minimum time (e.g., minimizing time $t_f$). The maneuver will also adhere to the desired end-point conditions on the spacecraft angular rates, $\omega_0$ and $\omega_f$, and the CMG gimbal angles, $\delta_0$ and $\delta_f$, if any are specified.

Additional constraints can be defined on the states and/or controls for designing maneuvers that can be implemented on a real spacecraft system 10, for example, by defining appropriate path constraints, $p(x,u,t) \leq 0$, for the optimal control problem. For example, avoiding saturation of the CMG torque inputs can be facilitated by limiting the maximum angular rate of the spacecraft 10, wherein a reasonable angular rate limit is $\omega_{max} = 3.5$ deg/sec for the exemplary ground-based testbed described herein. This constraint 76 can be incorporated into the optimal control problem 78 as $p_\omega(x,u,t) = |\omega_i| - \omega_{max} \leq 0$, for i=1, 2, 3. Additional constraints 76 on the quaternion norm or limits on the spacecraft acceleration can also be implemented by developing appropriate path constraint functions 76b. The problem in (13) above can be solved efficiently in one embodiment using the Legendre Pseudospectral optimal control theory instantiated in the software package DIDO.

Figure 12:
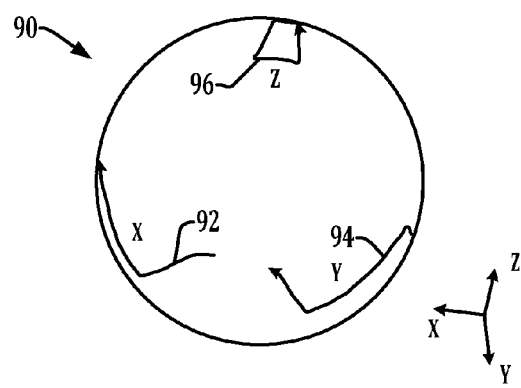
FIG. 12 is a three-dimensional visualization of a shortest-time maneuver (STM) showing spacecraft rotation projected on a sphere using open-loop propagation techniques.

Referring also to the three-dimensional visualization 90 in FIG. 12, in one implementation, the STM problem was solved for a 70-deg maneuver around the z-body axis of the ground-based testbed in order to illustrate the predictability of closed-loop implementation of shortest-time maneuvers. In this example, the optimal maneuver time is 18.5-sec, and FIG. 12 illustrates a visualization of the shortest-time maneuver, showing spacecraft rotation projected onto a sphere, including X, Y, and Z axis maneuver paths 92, 94 and 96, respectively. As seen in FIG. 12, the spacecraft 10 simultaneously rotates about all three body axes in order to minimize the maneuver time.

Figure 13:
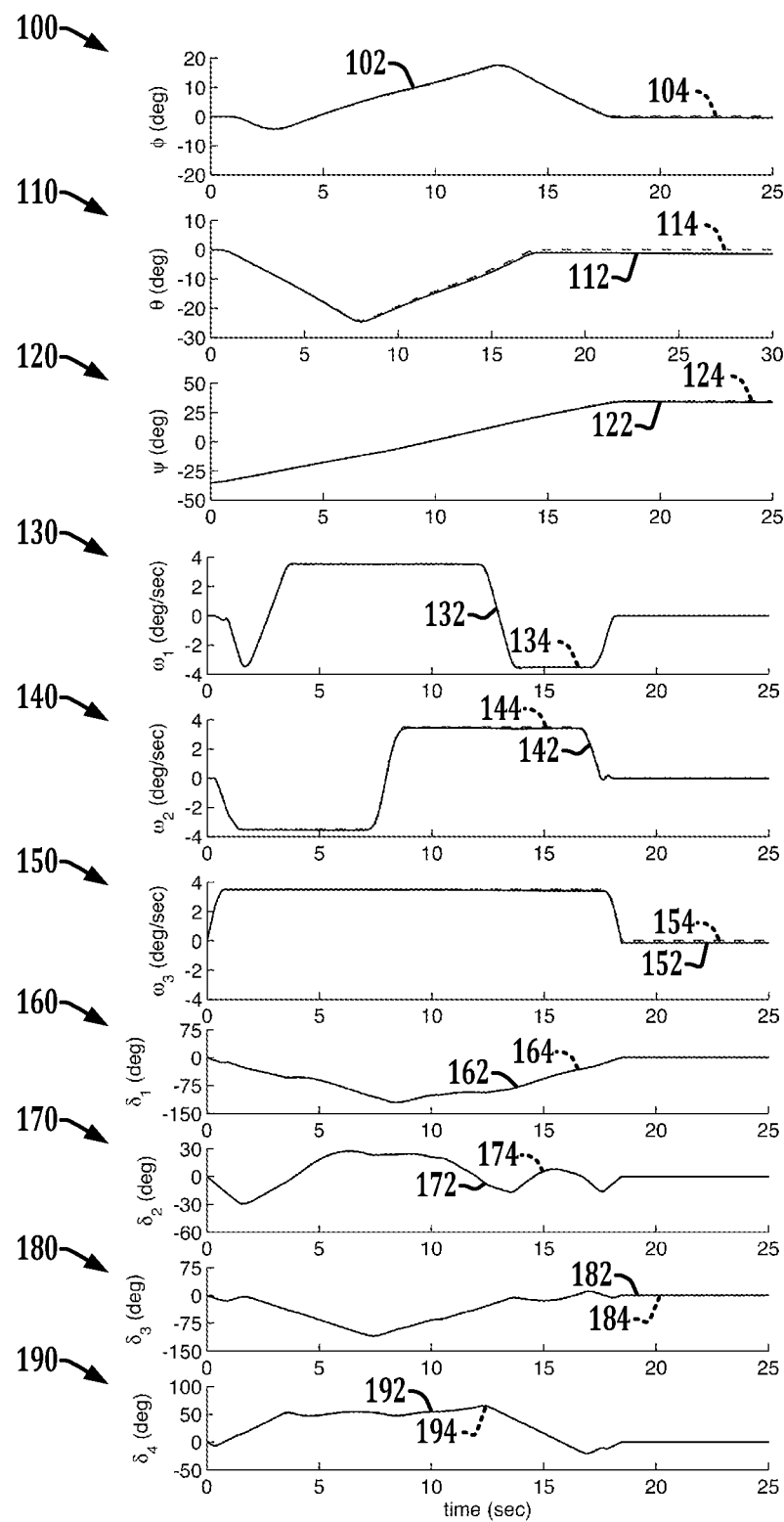
FIG. 13 is a graph illustrating various attitude angle, body rate and CMG gimbal angle curves for a shortest-time maneuver solved using an open-loop approach.

FIG. 13 provides graphs 100, 110, 120, 130, 140, 150, 160, 170, 180 and 190 illustrating attitude angle, body rate and CMG gimbal angle curves for the shortest-time maneuver solved using this open-loop approach. The graphs 100, 110, 120, 130, 140, 150, 160, 170, 180 and 190 of FIG. 13 respectively illustrate open-loop curves 102, 112, 122, 132, 142, 152, 162, 172, 182 and 192 (solid-line curves in the figure) as well as optimal value curves 104, 114, 124, 134, 144, 154, 164, 174, 184 and 194 (dashed-line curves). Optimality of the maneuver was verified using standard checks, wherein the verification and validation process included an open-loop propagation test in which the optimal gimbal rate control was propagated through the system dynamic equations, by using a standard numerical integrator (e.g. a $4^{th}$-order Runge-Kutta method). The results of the propagation test are seen in FIG. 13, showing that the system states evolve as expected and that the maneuver can be successfully implemented for the nominal system 10. In this example, moreover, the residual error norm at the end of the optimal control propagation was 1.2-deg. As seen in FIG. 13, the graphs 100, 110 and 120 show the attitude angles $\phi$, $\theta$, and $\psi$, respectively, as a function of time during the maneuver, graphs 130, 140 and 150 show the body rates $\omega_1$, $\omega_2$ and $\omega_3$, respectively, and the graphs 160, 170, 180 and 190 show the elements of the 4-dimensional gimbal angle vector $\delta_1$, $\delta_2$, $\delta_3$ and $\delta_4$ during the maneuver of the spacecraft 10, respectively.

Figure 14:
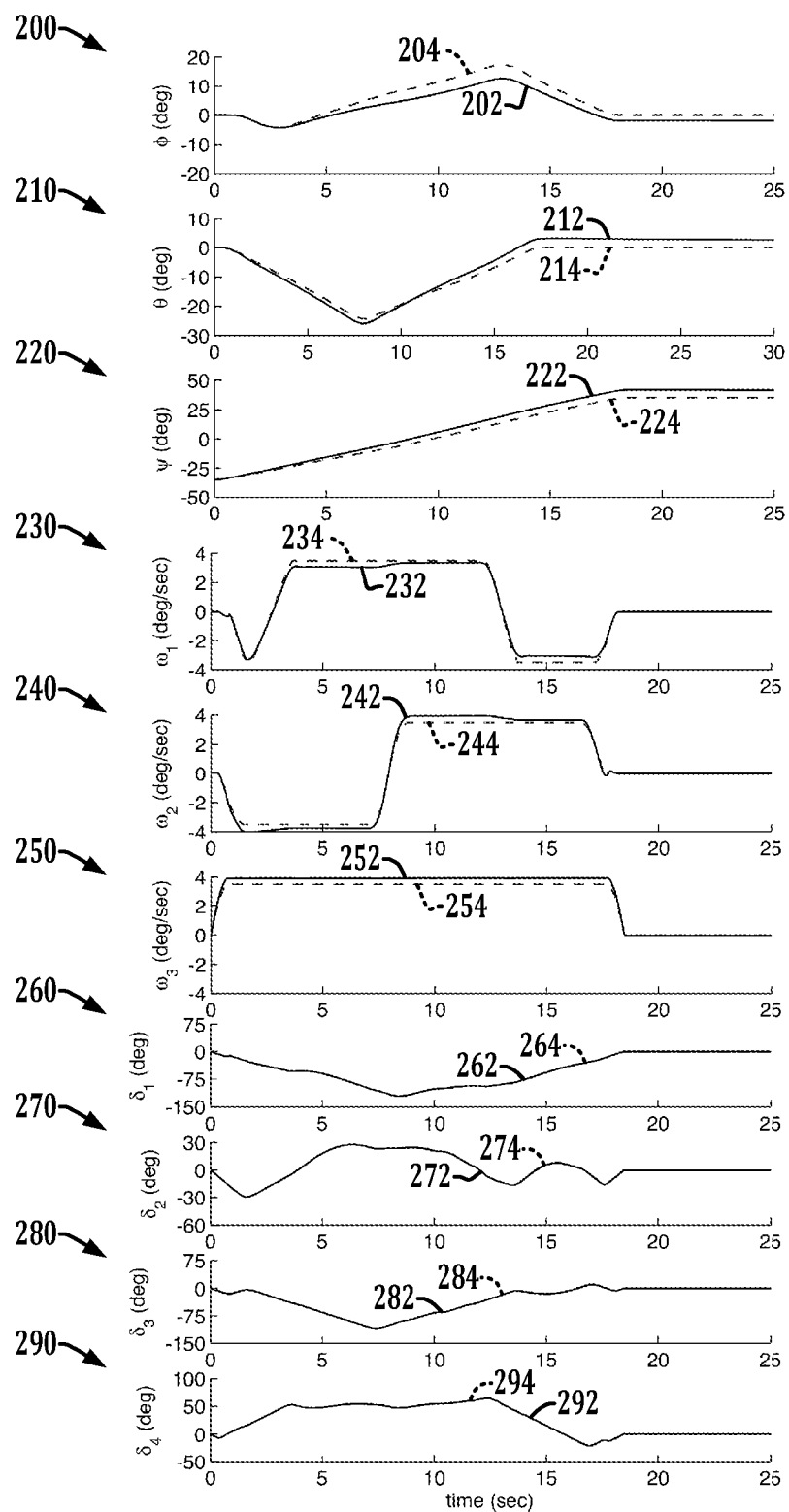
FIG. 14 is a graph illustrating various attitude, body rate and gimbal angle curves for open-loop implementation of a shortest time maneuver with 10% inertia uncertainty.

FIG. 14 shows graphs 200, 210, 220, 230, 240, 250, 260, 270, 280 and 290 illustrating attitude angle, body rate and CMG gimbal angle curves for the open-loop implementation of the STM with 10% inertia uncertainty, wherein open-loop curves 202, 212, 222, 232, 242, 252, 262, 272, 282 and 292 are shown in solid line, and optimal value curves 204, 214, 224, 234, 244, 254, 264, 274, 284 and 294 are shown in dashes lines. Inaccurate products of inertia or control-axis misalignment or other uncertainties can cause the residual error at the end of the maneuver to increase significantly if the optimal gimbal rates are implemented in the open-loop, for example by operating the spacecraft as exemplified by the block diagram shown in FIG. 11. For instance, FIG. 14 shows one open-loop STM implementation assuming the typical 10% uncertainty in the spacecraft inertia matrix. In this regard, the graphs 200, 210 and 220 show that the residual error at the end of the open-loop maneuver is more than 7-deg. Moreover, some of the spacecraft angular rates are seen in graphs 230, 240 and 250 to exceed the specified maximum rate of $\omega_{max} = 3.5$ deg/sec. This behavior is undesirable because the violation of the angular rate constraint may cause the CMGs 12 to become saturated, and/or cause loss of control of the spacecraft.

Such issues can be avoided in practice by implementing STMs via closed-loop control, such as shown in FIGS. 4 and 5 above. In such implementations, the optimal attitude trajectories may be used as guidance inputs to the closed-loop attitude control system, even when the number of CMGs 12 is reduced to three due to hardware failures.

Figure 15:
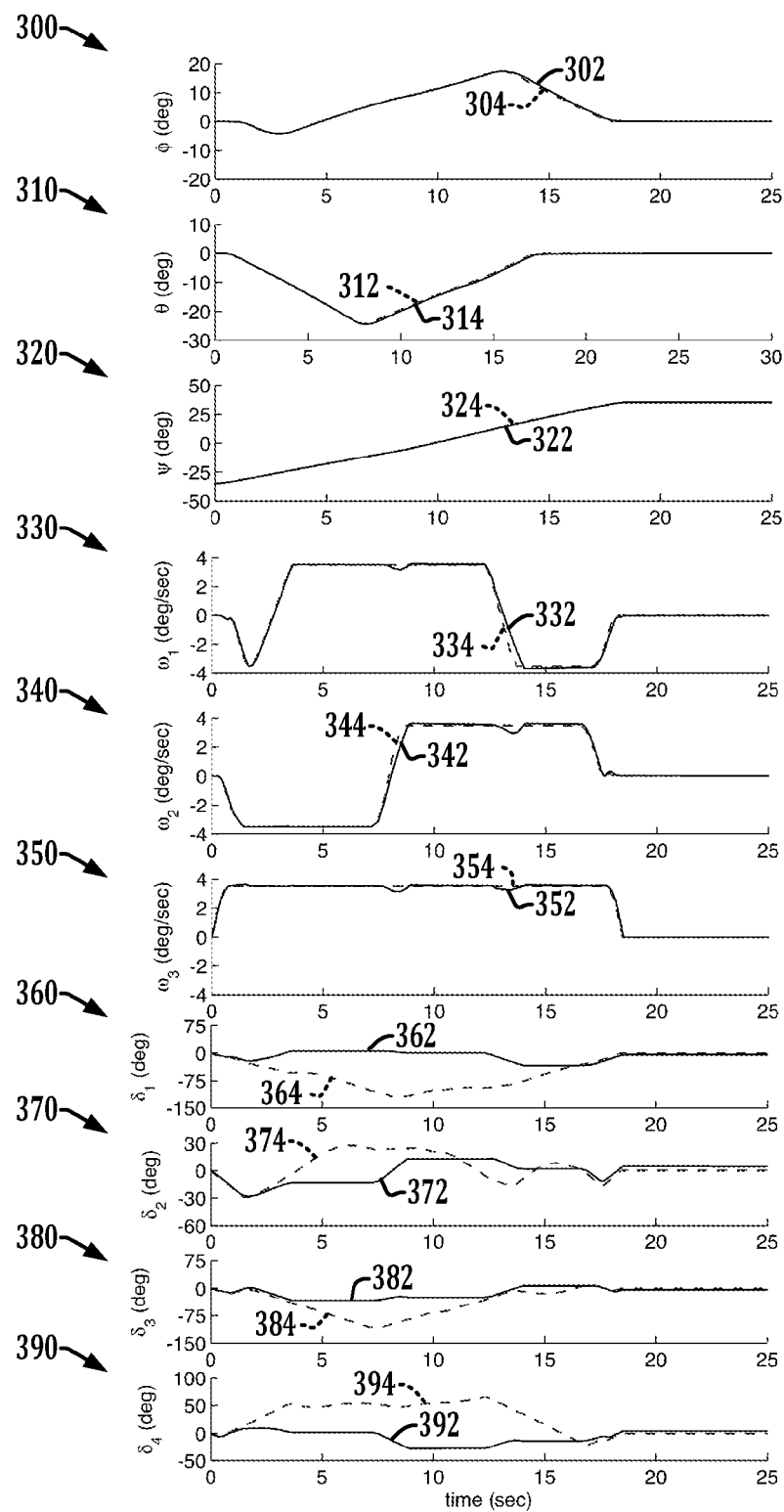
FIG. 15 is a graph illustrating various attitude, body rate and gimbal angle curves showing an exemplary optimal solution and closed-loop performance of a shortest-time maneuver with 10% inertia uncertainty.

Referring now to FIG. 15, graphs 300, 310, 320, 330, 340, 350, 360, 370, 380 and 390 illustrate attitude, body rate and gimbal angle curves showing optimal and closed-loop performance of the STM with 10% inertia uncertainty. The graphs 300, 310, 320, 330, 340, 350, 360, 370, 380 and 390 in FIG. 15 respectively show solid-line closed-loop curves 302, 312, 322, 332, 342, 352, 362, 372, 382 and 392, as well as optimal (dashed-line) curves 304, 314, 324, 334, 344, 354, 364, 374, 384 and 394. As seen in FIG. 15, the results obtained when implementing the closed-loop STM with 10% inertia uncertainty, the residual closed-loop error norm is 0.3-deg. In addition, while the spacecraft 10 ultimately achieves the desired final orientation, the spacecraft internal states now deviate appreciably from their expected values, for example, as seen in the CMG gimbal angle graphs 360, 370, 380 and 390 where the actual closed-loop values 362, 372, 382, 392 (solid lines) deviate significantly from the optimal values 364, 374, 384, 394 (dashed lines). Consequently, agile maneuvers for CMG spacecraft 10 designed using the existing optimal control approach do not have consistent internal states and may therefore violate operational constraints when they are implemented in the closed-loop. The inventors have further appreciated that this problem is further exacerbated when planning a sequence of back-to-back maneuvers, wherein incorrect gimbal angles at the end of a particular maneuver may place the CMG array in an unexpected configuration and make it impossible to correctly initiate subsequent slews or maneuvers.

Figure 16:
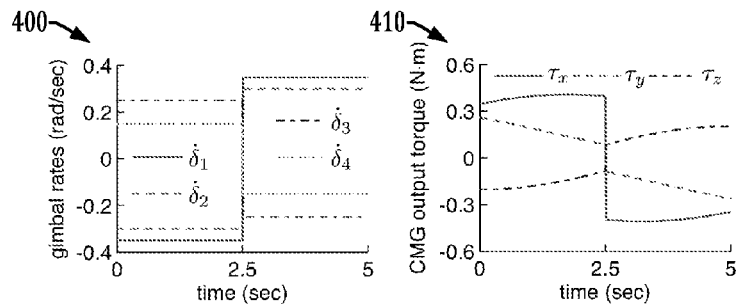
FIG. 16 shows exemplary open-loop gimbal command and CMG output torque curves.
Figure 17:
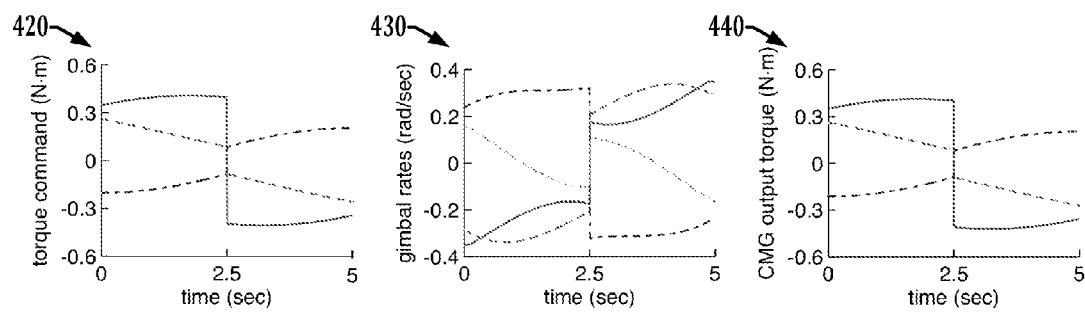
FIG. 17 illustrates exemplary closed-loop torque command, gimbal command and CMG output torque curves processed by the CMG steering law in accordance with one or more aspects of the present disclosure.

Referring now to FIGS. 16-20, the inventors have further appreciated that the mismatch between the open and closed-loop evolution of the system states in FIG. 15 above can be attributed at least in part to the allocation of the body torque commands to the individual CMGs 12 by the steering law 34. FIGS. 16 and 17 illustrate an example of the CMG output torque produced on the spacecraft 10 for the open-loop case (graphs 400 and 410 in FIG. 16) and for the case using the closed-loop attitude control architecture (graphs 420, 430 and 440 in FIG. 17). The traces in FIG. 16 show open-loop operation where the CMG array is driven directly using open-loop gimbal rate commands. Application of the gimbal rate commands in the graph 400 produces the CMG output torque shown in the graph 410. In FIG. 17, the graphs 420, 430 and 440 show the signals obtained in the closed-loop case, in which the graph 420 illustrates the desired body torque commands obtained from the attitude controller. In the ideal case, these are precisely the same as the open-loop torques illustrated in the graph 410 of FIG. 16. In FIG. 17, the torque commands are then processed by the CMG steering law 34 (in this case the Moore-Penrose pseudoinverse was used) to produce the gimbal rate profiles shown in the graph 430 of FIG. 17. The gimbal rates generated by the steering law differ significantly from their open-loop counterparts (compare the graph 400 of FIG. 16 with the graph 430 of FIG. 17). Despite this significant difference, however, the CMG output torque that is produced (graph 440 in FIG. 17) is identical to the open-loop output torque (graph 410 in FIG. 16). Thus, the closed-loop attitude control system will produce a nearly optimal attitude response as shown in FIG. 15. Yet, the CMG gimbal rates and CMG gimbal angles obtained in a closed-loop implementation of an open-loop optimal control solution may be appreciably different from the open-loop optimal control solution (graphs 360, 370, 380 and 390 of FIG. 15). The inventors have further appreciated that this result is at least partially due to the use of an array of four or more CMGs which gives rise to an over-actuated system so the same spacecraft motion can be produced using different configurations of the CMG array, as dictated by differing CMG gimbal rates and CMG gimbal angles.

The Moore-Penrose pseudoinverse, upon which CMG steering laws are fundamentally based, is an example of a generalized inverse $A^+$. As such, the mapping from the commanded torque $\tau_c$ to the gimbal rate commands $\dot{\delta}_c$ exists and is unique, provided that $A(\delta)$ is non-singular. Consequently, for each torque command vector, the CMG steering law 34 computes a unique vector of gimbal rate commands 34a, where the precise values of the gimbal rates 34a depend on the instantaneous configuration of the CMG array 12. Moreover, since the backward transformation from the torque space to the gimbal rate space is one-to-one, the forward transformation from the gimbal rate space to the output torque space is also one-to-one leading to the condition $A(\delta) A^+(\delta) = I$ where I is a 3×3 identity matrix. The consequence of this property is that the torque produced by the CMG is precisely the same as the commanded torque, i.e. $\tau = I\tau_c$. In addition, if the one-to-one relationships hold, then the properties of the generalized inverse ensure that $A^+(\delta)A(\delta)\dot{\delta}_c = \dot{\delta}_c$ is also true.

The inventors have appreciated that this discussion provides some insight into the reason for the discrepancy in the evolution of the closed-loop system states when the attitude controller 32 is utilized to track the optimal open-loop attitudes obtained from 44, 26. In this regard, it is believed that the primary issue is that optimal control using the open-loop model of FIG. 11 does not specifically force the gimbal rate commands 34a to lie on the manifold upon which the pseudoinverse transformation provides a one-to-one relationship between the torque space and the gimbal rate space. This can be seen by analyzing the time-histories of gimbal rate commands provided in the graph 400 of FIG. 16. At time t=2, for example, $\dot{\delta}_c(2)=[-0.35, -0.3, 0.25, 0.15]^T$. The time integration of the gimbal rate commands over the interval $0 \leq t \leq 2$ gives $\delta(2)=[-0.70, -0.60, 0.50, 0.30]^T$. Substituting these values in the relationship $A^+(\delta)A(\delta)\dot{\delta}_c$ gives the following equation (14).

$$\begin{bmatrix} 0.65 & -0.07 & -0.12 & 0.46 \\ -0.07 & 0.99 & -0.02 & 0.09 \\ -0.12 & -0.02 & 0.96 & 0.16 \\ 0.46 & 0.09 & 0.16 & 0.41 \end{bmatrix} \begin{bmatrix} -0.35 \\ -0.30 \\ 0.25 \\ 0.15 \end{bmatrix} = \begin{bmatrix} -0.17 \\ -0.26 \\ 0.31 \\ -0.09 \end{bmatrix} \quad (14)$$

As seen above, the right hand side of equation (14) is not equal to the original vector of gimbal rate commands, and thus the unique pseudoinverse mapping has not been preserved. This is the source of the discrepancy between the graph 400 and FIG. 16 in the graph 430 in FIG. 17. On the other hand, the values of the gimbal rate commands and the gimbal angles at t=2 in the graph 430 of FIG. 17 are, $\dot{\delta}_c(2)=[-0.28, -0.20, 0.32, -0.02]^T$ and $\delta(2)=[-0.55, -0.58, 0.58, 0.09]^T$. Evaluating $A^+(\delta)A(\delta)\dot{\delta}_c$ yields the following equation (15).

$$\begin{bmatrix} 0.76 & -0.02 & -0.19 & 0.38 \\ -0.02 & 1.00 & -0.02 & 0.03 \\ -0.19 & -0.02 & 0.85 & 0.31 \\ 0.38 & 0.03 & 0.31 & 0.39 \end{bmatrix} \begin{bmatrix} -0.28 \\ -0.20 \\ 0.32 \\ -0.02 \end{bmatrix} = \begin{bmatrix} -0.28 \\ -0.20 \\ 0.32 \\ -0.02 \end{bmatrix} \quad (15)$$

In this case, the right hand side of equation (15) is the same as the original vector of gimbal rate commands. Thus, the gimbal rate commands now lie on the one-to-one manifold of the pseudoinverse mapping and are therefore the same as the values that are produced by the closed-loop attitude control system.

The CMG steering law or steering logic 34 can be embedded as part of the formulated optimal control problem by any suitable technique (e.g., formulation at 64 in FIG. 6 above). This approach enables the design of shortest-time and other CMG maneuvers that are compatible with implementation using a closed-loop attitude control system. The inventors have appreciated that this approach effectively introduces a mechanism that ensures the uniqueness of the CMG steering is preserved by the optimal control. To this end, the optimal control problem 78 (FIGS. 7 and 8) is augmented to accommodate the influence of the CMG steering law 34 by use of the steering law constraint 77, in one example denoted by the mapping $\dot{\delta}_c = A^* \dot{h}_c$ (e.g., path constraint 77 in the example of FIG. 7 above).

Figure 18:
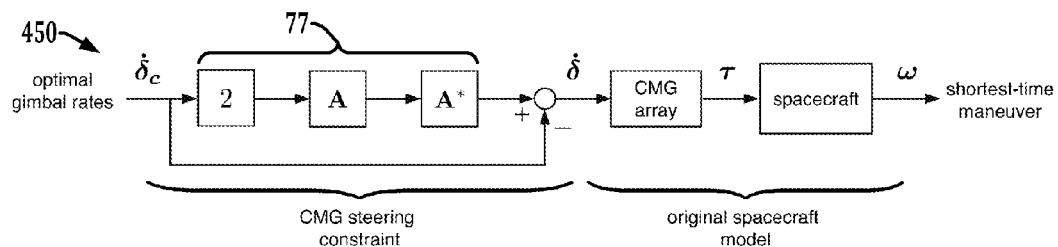
FIG. 18 is a simplified system diagram of a spacecraft model for optimal control with CMG steering constraints according to various aspects of the present disclosure.

FIG. 18 illustrates a block diagram 450 showing a revised spacecraft model for optimal control with an embodiment of a CMG steering constraint 77. The key modification in the problem formulation in this case is the inclusion of the equation $2A^* A \dot{\delta}_c - \dot{\delta}_c = \dot{\delta}$ as a CMG steering constraint. Due to the properties of the control allocation provided by steering law 34, the CMG steering constraint shown in the block diagram of FIG. 18 implies that $2A^* A \dot{\delta}_c - \dot{\delta}_c = 2A^*(AA^*)\dot{h}_c - A^* \dot{h}_c = 2A^* I \dot{h}_c - A^* \dot{h}_c = A^* \dot{h}_c = \dot{\delta}$. Thus, if the difference $\epsilon = A^* \dot{h}_c - \dot{\delta}$ can be made arbitrarily small, where the use of term "arbitrarily" refers to a tolerance $\epsilon$ selected by the use of the process, then an optimal control solution satisfying $-\epsilon \leq A^* \dot{h}_c - \dot{\delta} \leq \epsilon$ will preserve the control allocation of CMG steering law 34 as part of the guidance command trajectory. Although the solution to a modified STM problem that incorporates CMG steering law constraint 77 is still inherently open-loop, any optimal control that satisfies CMG steering constraint 77 will now be fully compatible with implementation using closed-loop attitude control.

A variety of different steering laws 34 can be utilized with the approach, and several different steering logics have been integrated and tested with the modified approach. A first possible steering law 34 is the singularity robust inverse logic mentioned previously, as seen in the following equation (16), where $$A^* = A^T [AA^T + \lambda I]^{-1} \quad (16)$$

using a positive constant for the value of $\lambda$. As an alternative, a steering law where the scale factor $\lambda$ is automatically adjusted in reference to the condition number of the A matrix may also be implemented, in which case the value of $\lambda$ may be adjusted according the following equation (17):

$$\lambda = \begin{cases} \lambda_0 (1 - m/m_0)^2 & \text{for } m < m_0 \\ 0 & \text{for } m \geq m_0 \end{cases} \quad (17)$$

where $m^2 = \det(AA^T)$ and $\lambda_0$ and $m_0$ are properly selected constants.

In another possible embodiment, a CMG steering law 34 with time-varying off-diagonal terms can be integrated as a CMG steering constraint 77 as part of the modified optimal control problem formulation for S™ or other maneuvers. This robust singularity-avoiding steering logic has the form set forth in the following equation (18):

$$A^* = A^T [AA^T + \lambda_0 E]^{-1} \quad (18)$$

where matrix E is a time-varying weighting matrix as shown in the following equation (19):

$$E = \begin{bmatrix} 1 & \epsilon_3(t) & \epsilon_2(t) \\ \epsilon_3(t) & 1 & \epsilon_1(t) \\ \epsilon_2(t) & \epsilon_1(t) & 1 \end{bmatrix} \quad (19)$$

and the time-varying terms can be selected according to the following equation (20).

$$\epsilon_i = \epsilon_0 \sin(\omega_0 t + \phi_i) \quad (20)$$

The values of parameters $\lambda_0$, $\epsilon_0$, $\omega_0$, and $\phi_i$ in the above equations (18) and (20) in certain embodiments may be used as design degrees of freedom.

Figure 19:
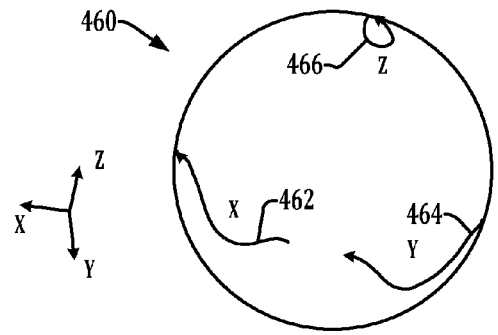
FIG. 19 is a three-dimensional visualization of a shortest-time maneuver showing spacecraft rotation projected on a sphere using the closed loop techniques of the present disclosure.

Referring now to FIG. 19, the previous 70-deg z-axis slew was re-optimized for the testbed to illustrate the efficacy of the new approach for shortest-time CMG maneuver design. The optimal control problem 78 in this example was solved so that the influence of the closed-loop CMG steering law 34 could be properly accounted for by way of the steering law constraint 77, wherein the results for singularity robust steering using equation (16) with a small constant value of design parameter $\lambda$ are presented. FIG. 19 shows a visualization 460 of the spacecraft rotation motion for X 462, Y 464 and Z 466 projected onto a sphere for the STM with consistent internal states, wherein the optimal maneuver time in this case was 18.5-sec, which is the same value as the one obtained from the original problem formulation. The maneuver trajectories are, however, slightly different (e.g., compared with those of FIG. 12 above) since the optimal control has now been shaped to be compatible with the closed-loop steering logic. The same validation and verification tests as before were applied to verify the optimality of the re-designed maneuver, including an open-loop propagation test using the block diagram of FIG. 18.

Figure 20:
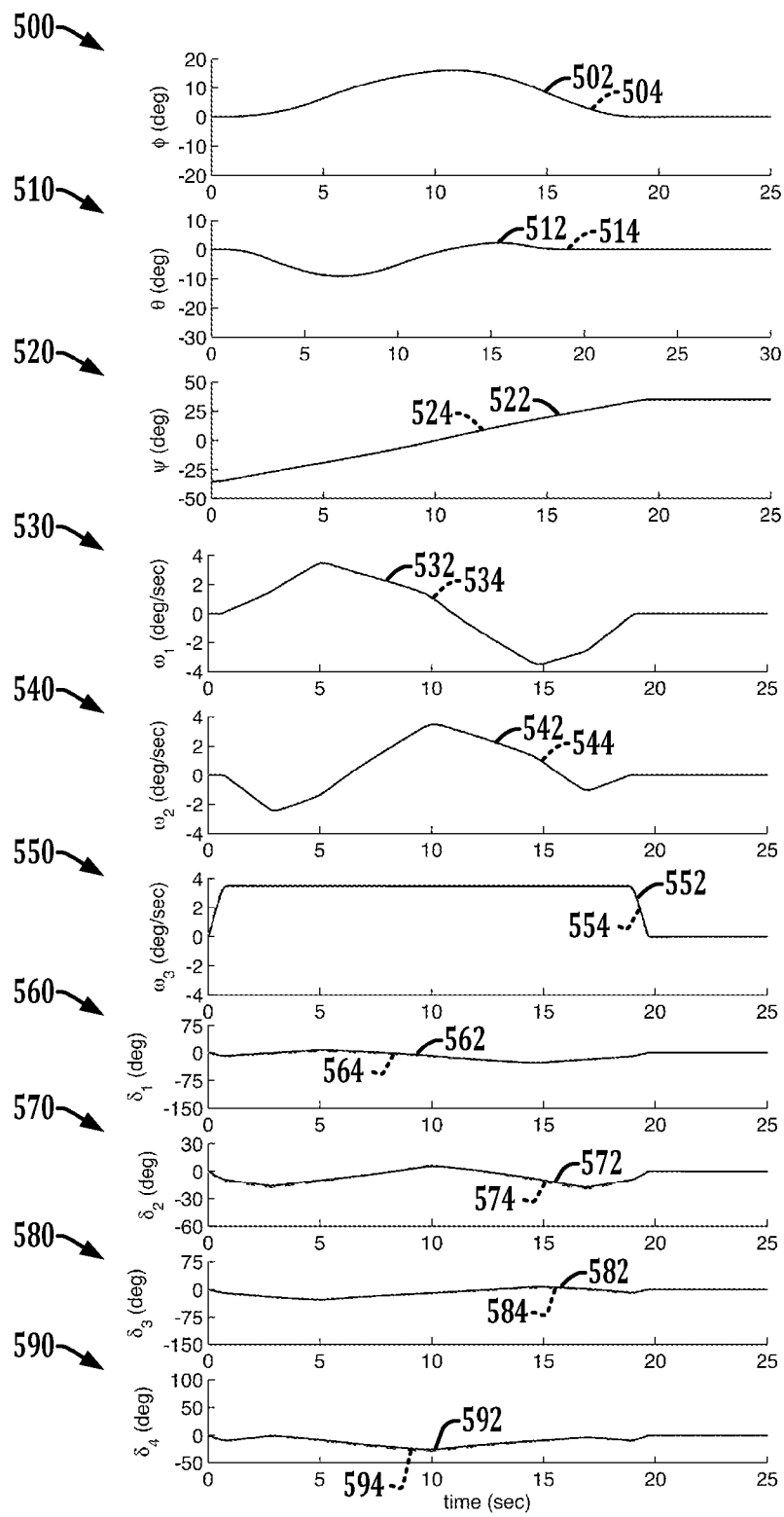
FIG. 20 is a graph illustrating various attitude, body rate and gimbal angle curves for a shortest-time CMG maneuver with consistent internal states and 10% inertia uncertainty in accordance with the present disclosure.

Following the verification tests, the STM was implemented for the case with 10% inertia uncertainty by using the closed-loop attitude control system to track the optimal attitude trajectory, using the same gains as before to create the graphs of FIG. 15. FIG. 20 shows a closed-loop implementation of the STM obtained by way of utilizing steering law constraint 77 so as to provide a maneuver having consistent internal states (10% inertia uncertainty), including attitude angle graphs 500, 510 and 520, body rate graphs 530, 540 and 550, and CMG gimbal angle graphs 560, 570, 580 and 590, wherein the closed-loop states are shown in solid-line curves 502, 512, 522, 532, 542, 552, 562, 572, 582 and 592, and the optimal states are shown in dashed-line curves 504, 514, 524, 534, 544, 554, 564, 574, 584 and 594. The results in FIG. 20 show a much-improved agreement between the optimal spacecraft states and those obtained from the closed-loop implementation, where the difference between the optimal and closed-loop trajectories is indistinguishable for all the internal states. Moreover, the residual closed-loop error norm has been further reduced to less than 0.1-deg. Without wishing to be tied to any particular theory, the primary driver behind this superior result is believed to be the fact that the pseudoinverse mapping (control allocation) inherent to the steering law 34 of the closed-loop feedback system 30 has now been properly embedded as part of the optimal control solution. This enables the closed-loop attitude controller 32 to precisely track the shortest-time maneuver.

As seen above, the present disclosure provides for including a steering law constraint 77 in the formation of the optimal control problem 78 at least partially based on the steering law 34 used in operating the spacecraft 10. In certain embodiments, the steering law constraint 77 can be received as part of the input data including the initial spacecraft state 72, the final desired spacecraft state 74 and the other constraints 76, and the steering law constraint 77 may be incorporated into the control problem in certain embodiments as either a dynamic constraint 76a or as a path constraint 76b. As shown in the example of FIG. 7 above, the steering law constraint 77 may be included in the control problem 78 as a path constraint 76b, for example, $-\epsilon \leq A^* \dot{h} - \dot{\delta} \leq \epsilon$, which sets either or both of a lower bound $-\epsilon$ and an upper bound $\epsilon$ on the difference $A^* h' - \delta'$ between a control allocation $A^* h'$ and the CMG angle rate vector $\epsilon'$, where $A^*$ is the steering law 34, and h' is a CMG output torque vector. In certain implementations, moreover, an objective or cost function 79 can be constructed, including a spacecraft system state defined by a spacecraft attitude vector 46 $q=[q_1, q_2, q_3, q_4]^T$, a spacecraft rate vector 46 $\omega=[\omega_1, \omega_2, \omega_3]^T$, a CMG angle vector 74a $\delta=[\delta_1, \ldots, \delta_n]^T$, along with a control variable vector u* representing a CMG angle rate vector $\delta'=[\delta'_1, \ldots, \delta'_n]^T$. Moreover, the objective function construction in certain examples provides an objective function 79 (e.g., J[x(·), u(·), t]) at least partially in terms of the overall maneuver time $t_f - t_o$, and the control problem 78 is solved solving (e.g., at 66 in FIG. 6 above) to at least partially minimize the overall maneuver time $t_f - t_o$. As mentioned above, moreover, the objective function 79 may be constructed in certain embodiments at least partially in terms of maneuver energy expenditure represented, for example, by a weighted sum of squares of the CMG angle rates 74a $w_1 \int_{t_o}^{t_f} \sum_{i=1}^{n} \dot{\delta}_i^2$, and the control problem solution in this case involves at least partially minimizing the weighted of sum of squares of the CMG angle rates 74a. In other possible implementations, the objective function 79 may be constructed in terms of maneuver energy expenditure represented by a weighted sum of squares of the CMG angle accelerations, and the control problem 78 is solved to at least partially minimize the weighted sum of squares of the CMG angle accelerations.

Two different exemplary formulations are provided below of an optimal control problem for solving optimal attitude maneuvers with generic CMG steering laws 34. In order to develop the optimal control problem formation, a mathematical model is specified describing the dynamics of the spacecraft 10 and the CMG array 12, to provide a vector of state variables x and a vector of control variables u. An exemplary state vector is given by the following equation (21):

$$x = \begin{bmatrix} q_1 \\ q_2 \\ q_3 \\ q_4 \\ \omega_1 \\ \omega_2 \\ \omega_3 \\ \delta_1 \\ \vdots \\ \delta_n \end{bmatrix} \quad (21)$$

where $q_i$ represent attitude quaternions, $\omega_i$ are angular rates, and $\delta_i$ are the gimbal angles of a plurality of n CMGs 12. Other representations for the spacecraft attitude, such as Euler angles, could also be used. In one exemplary formulation of the optimal control problem, the control vector may be defined according to the following equation (22):

$$u = \begin{bmatrix} \dot{\delta}_1 \\ \vdots \\ \dot{\delta}_n \end{bmatrix} \quad (22)$$

where $\dot{\delta}_i$ are CMG gimbal rates 34a for each of n CMGs. In another exemplary optimal control problem formulation, the control vector may be defined according to the following equation (23):

$$u = \begin{bmatrix} \tau_{c,1} \\ \tau_{c,2} \\ \tau_{c,3} \end{bmatrix} \quad (23)$$

where $\tau_{c,i}$ represents one of three orthogonal command torques 32a defined in the spacecraft body-fixed frame (see FIG. 5 above). An exemplary formulation of the optimal control problem 78 for solving optimal attitude maneuvers with a generic CMG steering law 34 in one possible implementation (e.g., FIG. 7 above) includes (i) an objective function or cost function 79, (ii) dynamic constraints 76a, (iii) endpoint constraints 72, 74, and (iv) path constraints 76b. The objective function 79 provides a metric by which the fitness of a candidate solution to the control problem 78 may be judged, with the goal being to find a solution which minimizes or maximizes a given objective function 79. The dynamic constraints 76a define a dynamical model of spacecraft system 10 that allows the time evolution of the system state vector x(t) to be determined in response to the application of particular control trajectory given by vector u(t). The endpoint constraints 72, 74 represent the initial and final desired conditions of the system state vector for a given attitude maneuver. The endpoint constraints 72 and 74, moreover, may be open or closed meaning that a particular element of the system state vector must take a specific value at the beginning or end of an attitude maneuver (closed) or that a particular element of the system state vector may take on any value within a specified range (open). The path constraints 76b are any other function of the system state, parameters, control or time that must be adhered to in order to operate the spacecraft system 10. An exemplary optimal control problem formulation is given as follows (e.g., FIG. 7):

$$\text{Minimize} \quad J[x(\cdot), u(\cdot), t] = t_f - t_o + w_1 \int_{t_o}^{t_f} \sum_{i=1}^{n} \dot{\delta}_i^2 \quad (24)$$

$$\text{Subject to} \quad \dot{x} = \begin{bmatrix} \frac{1}{2} Q(\omega) q \\ J^{-1}(-\omega \times J\omega - \omega \times h - \dot{h}) \\ u \end{bmatrix}$$

$$u = [\dot{\delta}_1, \ldots, \dot{\delta}_n]^T$$

$$x_o^L \leq [q(t_o), w(t_o), \delta(t_o)]^T \leq x_o^U$$

$$x_f^L \leq [q(t_f), \omega(t_f), \delta(t_f)]^T \leq x_f^U$$

$$p_1 := \omega_{i,min} \leq \omega_i \leq \omega_{i,max}, i = 1, 2, 3$$

$$p_2 := \dot{\omega}_{i,min} \leq \dot{\omega}_i \leq \dot{\omega}_{i,max}, i = 1, 2, 3$$

$$p_3 := \delta_{i,min} \leq \delta_i \leq \delta_{i,max}, i = 1, \ldots, n$$

$$p_4 := \dot{\delta}_{i,min} \leq \dot{\delta}_i \leq \dot{\delta}_{i,max}, i = 1, \ldots, n$$

-continued $$p_5 := q_1^2 + q_2^2 + q_3^2 + q_4^2 - 1 = 0$$

$$p_6 := -\varepsilon \leq A*h - \dot{\delta} \leq \varepsilon$$

where vectors h and ḣ represent the stored momentum and output torque of the CMG array 12 as expressed in the spacecraft body-fixed frame 10. Vectors h and i may be computed from the values of the state and control vectors x, u by using the above equations (2)-(5).

In (24), the exemplary objective function considers the overall attitude maneuver time $t_f-t_o$ as well as the weighted sum of squares of the CMG gimbal rates. Other objective functions 79 are also possible and may be constructed as desired by the user of the process 60, for example by setting weight $w_1=0$, minimizing the objective function results in a minimum-time attitude maneuver. The dynamics constraints 76a in this example are given by the equation ẋ=f(x,u,t), wherein f(x,u,t) represents mathematical a model of the spacecraft system dynamics. The endpoint constraints 72 and 74 are defined by the vectors $x_o^L$, $x_o^T$, $x_f^L$ and $x_f^U$, which limit the values of the elements of the system state vector, x, at the initial and final times $t_o$ and $t_f$, respectively. Path constraint $p_1$ provides a limit on the permissible values of the spacecraft angular rates, whereas path constraint $p_2$ provides a limit on the permissible values of the spacecraft angular accelerations. Path constraint $p_3$ restricts the values of the CMG gimbal angles and path constraint $p_4$ provides a limit on the permissible CMG gimbal rates. Path constraints $p_1$ through $p_4$ are optional constraints that may be supplied by the operator of the process and they may be removed from the problem formulation if no such limits exist. However, in the preferred embodiment, one or more of $p_1$ through $p_4$ will be specified by the user of the process. Path constraint $p_2$ ensures that the quaternion normalization condition holds and is therefore included in the preferred embodiment of the present invention. The final path constraint given in the exemplary problem formulation of (24), i.e. $p_6$, is the CMG steering law constraint 77 that may be utilized advantageously as part of the optimal control problem formulation (e.g., at 64 in FIG. 6) to ensure that the influence of the CMG steering law 34 is included as part of the solution to the control problem 78. In other words, the steering law path constraint 77 ($p_6=\varepsilon \leq A*h-\dot{\delta} \leq \varepsilon$) ensures that the optimal control solution will be accurately reproduced according to the selected value of tolerance $\varepsilon$ when the optimized attitude maneuver is implemented in using a closed-loop feedback system, such as the exemplary attitude control system given in FIG. 5 above. In one preferred embodiment, $\varepsilon$–0 is selected.

In another possible embodiment (FIG. 8 above), the steering law constraint 77 is included in the control problem 78 as a dynamics constraint 76a. In the illustrated example, moreover, the steering law constraint 77 A*u defines a product of the steering law A* 34 and a control variable vector u. This exemplary optimal control problem formulation is illustrated in the following (25):

$$\text{Minimize} \quad J[x(\cdot), u(\cdot), t] = t_f - t_o + w_1 \int_{t_o}^{t_f} \sum_{i=1}^{n} \dot{\delta}_i^2 \quad (25)$$

$$\text{Subject to} \quad \dot{x} = \begin{bmatrix} \frac{1}{2}Q(\omega)q \\ J^{-1}(-\omega \times J\omega - \omega \times h - \dot{h}) \\ A*u \end{bmatrix}$$

-continued $$u = [\tau_{c,1}, \tau_{c,2}, \tau_{c,3}]^T$$

$$x_o^L \leq [q(t_o), w(t_o), \delta(t_o)]^T \leq x_o^U$$

$$x_f^L \leq [q(t_f), \omega(t_f), \delta(t_f)]^T \leq x_f^U$$

$$p_1 := \omega_{i,min} \leq \omega_i \leq \omega_{i,max}, i = 1, 2, 3$$

$$p_2 := \dot{\omega}_{i,min} \leq \dot{\omega}_i \leq \dot{\omega}_{i,max}, i = 1, 2, 3$$

$$p_3 := \delta_{i,min} \leq \delta_i \leq \delta_{i,max}, i = 1, \ldots, n$$

$$p_4 := \dot{\delta}_{i,min} \leq \dot{\delta}_i \leq \dot{\delta}_{i,max}, i = 1, \ldots, n$$

$$p_5 := q_1^2 + q_2^2 + q_3^2 + q_4^2 - 1 = 0$$

$$p_6 := \tau_{i,min} \leq \tau_{c,i} \leq \tau_{i,max}, i = 1, 2, 3$$

where vectors h and ḣ are computed from the values of the state and control vectors by the above equations (2)-(5). As described above, the main difference between optimal control problem formulation 25 and optimal control problem formulation 24 is that in the former, the CMG steering law constraint 77 is incorporated as a dynamic constraint 76a (as shown in FIG. 8), i.e $\dot{\delta}$=A*u. In addition, an optional path constraint 76b, namely $p_7$ may be added as shown in (25 and FIG. 8 above) in order to limit the permissible values of the control torque vector $\tau_C$.

In other embodiments, the rate of change of the control variables may be constrained through the use of the concept of a "dimension lift", in which the control variable is appended as part of the state vector and a new control variable, representing the time-derivative of the original control variable, and is introduced as part of the problem formulation. For example in exemplary problem formulation (24) above, the state vector could be alternatively written by appending vector $\delta'=[\delta'_1, \ldots, \delta'_n]^T$ and follows $$x = \begin{bmatrix} q_1 \\ q_2 \\ q_3 \\ q_4 \\ \omega_1 \\ \omega_2 \\ \omega_3 \\ \delta_1 \\ \vdots \\ \delta_n \\ \dot{\delta}_1 \\ \vdots \\ \dot{\delta}_n \end{bmatrix} \quad (26)$$

The new control vector will become $u=[\delta''_1, \ldots, \delta''_n]^T$. An additional path constraint, $\delta''_{i,min} \leq \delta''_i \leq \delta''_{i,max}$, $i=1, \ldots, n$ may also be included as part of such an alternative optimal control problem formulation.

In yet another embodiment of the present invention an additional path constraint may be added which incorporates the following equation (27) as part of the optimal control problem formulation $$p_8 := m_{min} \leq \sqrt{\det(AA^T)} \leq m_{max} \quad (27)$$

The effect of including the path constant given in equation (27) is to enable the user of the invention to control the permissible values of the CMG array singularity index m=

$\sqrt{\det(AA^T)}$. By selecting a value for $m_{min} > 0$, the user of the process may further influence the shaping of the optimal maneuver guidance command trajectories to maintain the orientation of an array of CMGs 12 away from singular states. This aspect of the present invention may be advantageously utilized when designing a series of maneuvers that are to be performed in a sequence, such as in an satellite imaging application.

The present disclosure thus provides a new approach for designing shortest-time and other spacecraft maneuvers that is applicable to closed-loop attitude control of CMG spacecraft 10, including integration of a novel CMG steering constraint 77 as part of the control problem formulation. In the absence of the CMG steering constraint 77, the closed-loop evolution of the spacecraft internal states, in particular the CMG gimbal angles, can deviate significantly from the optimal solution (e.g., FIG. 15 above), which may cause hardware or other mission constraints to become violated if the maneuver is implemented on orbit. To address this issue, the CMG steering law constraint 77 or the CMG steering law constraint 77 in conjunction with the path constraint given in equation (27) is utilized to shape the shortest-time maneuver trajectories to be compatible with the closed-loop steering logic 34. The CMG steering constraint 77 permits the unique pseudo-inverse mapping (control allocation) of the chosen CMG steering law 34 to be preserved by the optimal control so that maneuvers can be implemented predictably and reliably. Moreover, embedding the CMG steering logic 34 as part of the optimal control procedure enables the design of time-optimal, energy optimal, or other maneuvers with robust singularity avoidance as per the properties of CMG steering law 34.

It will be understood that many additional changes in the details, materials, procedures and arrangement of parts, which have been herein described and illustrated to explain the nature of the invention, may be made by those skilled in the art within the principal and scope of the invention as expressed in the appended claims. The inventors also note that a similar control allocation problem exists for spacecraft in which a plurality of reaction wheels are utilized as part of the attitude control system instead of a plurality of CMGs. The present invention can thus be modified and applied by anyone of ordinary skill in the art to develop an optimal control problem formulation for a reaction wheel-based attitude control system wherein a reaction wheel steering or control allocation law is incorporated as part of an optimal control problem formulation (as a path or dynamics constraint) to facilitate closed-loop implementation of optimized attitude maneuvers for reaction wheel spacecraft.

The following is claimed:

1. A method for guiding a spacecraft from an initial state to a final state using a plurality of control momentum gyroscopes, the method comprising:
   receiving input data including:
      an initial spacecraft state defining an initial spacecraft attitude vector, an initial spacecraft rate vector, an initial CMG angle vector, and an initial CMG angle rate vector,
      a desired final spacecraft state defining a desired final spacecraft attitude vector, a desired final spacecraft rate vector, a desired final CMG angle vector, and a desired final CMG angle rate vector, and
      a plurality of constraints defining desired limitations with respect to at least one of spacecraft attitude, spacecraft motion, and CMG operation, the plurality of constraints including a steering law constraint based on a steering law used in operating the spacecraft;
   formulating a control problem based at least partially on the input data including the steering law constraint;
   using at least one processor, solving the control problem to provide a time-varying attitude command vector comprising a plurality of time-varying attitude command signals or values representing a plurality of spacecraft states and control trajectories with respect to one or more of spacecraft angles, spacecraft angle rates, and spacecraft angle accelerations; and
   providing the time-varying attitude command vector as a guidance command input to an attitude controller of the spacecraft for operating the plurality of control momentum gyroscopes to guide the spacecraft from the initial state to the final state.

2. The method of claim 1, wherein the steering law constraint is included in the control problem as a path constraint setting at least one of a lower bound and an upper bound on a difference between a control allocation A*h' and the CMG angle rate vector, where A* is the steering law, and h' is a CMG output torque vector.

3. The method of claim 2:
   wherein formulating the control problem comprises constructing an objective function or cost function including:
      a spacecraft system state defined by a spacecraft attitude vector, a spacecraft rate vector, a CMG angle vector, and a CMG angle rate vector, and
      a control variable vector representing CMG gimbal accelerations.

4. The method of claim 3, wherein formulating the control problem comprises constructing the objective function or cost function in terms of overall maneuver time, and wherein solving the control problem comprises at least partially minimizing the overall maneuver time.

5. The method of claim 4, wherein formulating the control problem comprises constructing the objective function or cost function in terms of maneuver energy expenditure represented by a weighted of sum of squares of the CMG angle rates or CMG angle accelerations, and wherein solving the control problem comprises at least partially minimizing the weighted of sum of squares of the CMG angle rates or CMG angle accelerations.

6. The method of claim 3, wherein formulating the control problem comprises constructing the objective function or cost function in terms of maneuver energy expenditure represented by a weighted of sum of squares of the CMG angle rates or CMG angle accelerations, and wherein solving the control problem comprises at least partially minimizing the weighted of sum of squares of the CMG angle rates or CMG angle accelerations.

7. The method of claim 1, wherein the steering law constraint is included in the control problem as a dynamic constraint.

8. The method of claim 7, wherein the steering law constraint is included in the control problem as a dynamic constraint defining a product of the steering law A* and a control variable vector u.

9. The method of claim 7:
   wherein formulating the control problem comprises constructing an objective function or cost function including:
      a spacecraft system state defined by a spacecraft attitude vector, a spacecraft motion vector, a CMG angle vector, and a CMG angle rate vector, and a control variable vector representing CMG gimbal accelerations.

10. The method of claim 9, wherein formulating the control problem comprises constructing the objective function or cost function in terms of overall maneuver time, and wherein solving the control problem comprises at least partially minimizing the overall maneuver time.

11. The method of claim 10, wherein formulating the control problem comprises constructing the objective function or cost function in terms of maneuver energy expenditure represented by a weighted of sum of squares of the CMG angle rates or CMG angle accelerations, and wherein solving the control problem comprises at least partially minimizing the weighted of sum of squares of the CMG angle rates or CMG angle accelerations.

12. The method of claim 1:
wherein formulating the control problem comprises constructing an objective function or cost function including:
a spacecraft system state defined by a spacecraft attitude vector, a spacecraft motion vector, a CMG angle vector, and a CMG angle rate vector, and
a control variable vector representing CMG gimbal accelerations.

13. The method of claim 12, wherein formulating the control problem comprises constructing the objective function or cost function in terms of overall maneuver time, and wherein solving the control problem comprises at least partially minimizing the overall maneuver time.

14. The method of claim 13, wherein formulating the control problem comprises constructing the objective function or cost function in terms of maneuver energy expenditure represented by a weighted of sum of squares of the CMG angle rates or CMG angle accelerations, and wherein solving the control problem comprises at least partially minimizing the weighted of sum of squares of the CMG angle rates or CMG angle accelerations.

15. The method of claim 12, wherein formulating the control problem comprises constructing the objective function or cost function in terms of maneuver energy expenditure represented by a weighted of sum of squares of the CMG angle rates or CMG angle accelerations, and wherein solving the control problem comprises at least partially minimizing the weighted of sum of squares of the CMG angle rates or CMG angle accelerations.

16. The method of claim 1, wherein formulating the control problem comprises including a path constraint to control permissible values of a CMG array singularity index.

17. A non-transitory computer readable medium with computer executable instructions for guiding a spacecraft from an initial state to a final state using a plurality of control momentum gyroscopes, the computer readable medium having computer executable instructions for:
receiving input data including:
an initial spacecraft state defining an initial spacecraft attitude vector, an initial spacecraft rate vector, an initial CMG angle vector, and an initial CMG angle rate vector,
a desired final spacecraft state defining a desired final spacecraft attitude vector, a desired final spacecraft rate vector, a desired final CMG angle vector, and a desired final CMG angle rate vector, and
a plurality of constraints defining desired limitations with respect to at least one of spacecraft attitude, spacecraft motion, and CMG operation, the plurality of constraints including a steering law constraint based on a steering law used in operating the spacecraft;
formulating a control problem based at least partially on the input data including the steering law constraint;
solving the control problem to provide a time-varying attitude command vector comprising a plurality of time-varying attitude command signals or values representing a plurality of one or more of spacecraft states and control trajectories with respect to one of spacecraft angles, spacecraft angle rates, and spacecraft angle accelerations; and
providing the time-varying attitude command vector as a guidance command input to an attitude controller of the spacecraft for operating the plurality of control momentum gyroscopes to guide the spacecraft from the initial state to the final state.

18. A spacecraft guidance system, comprising:
at least one processor programmed to:
receive input data including:
an initial spacecraft state defining an initial spacecraft attitude vector, an initial spacecraft rate vector, an initial CMG angle vector, and an initial CMG angle rate vector,
a desired final spacecraft state defining a desired final spacecraft attitude vector, a desired final spacecraft rate vector, a desired final CMG angle vector, and a desired final CMG angle rate vector, and
a plurality of constraints defining desired limitations with respect to at least one of spacecraft attitude, spacecraft motion, and CMG operation, the plurality of constraints including a steering law constraint based on a steering law used in operating the spacecraft;
formulate a control problem based at least partially on the input data including the steering law constraint;
solve the control problem to provide a time-varying attitude command vector comprising a plurality of time-varying attitude command signals or values representing a plurality of spacecraft states and control trajectories with respect to one or more of spacecraft angles, spacecraft angle rates, and spacecraft angle accelerations; and
provide the time-varying attitude command vector as a guidance command input to an attitude controller of the spacecraft for operating the plurality of control momentum gyroscopes to guide the spacecraft from the initial state to the final state.

19. The spacecraft guidance system of claim 18, wherein the steering law constraint is included in the control problem as a path constraint setting at least one of a lower bound and an upper bound on a difference between a control allocation $A^*h'$ and the CMG angle rate vector, where $A^*$ is the steering law, and h' is a CMG output torque vector.

20. The spacecraft guidance system of claim 18, wherein the steering law constraint is included in the control problem as a dynamic constraint defining a product of the steering law $A^*$ and a control variable vector u.

21. The spacecraft guidance system of claim 18, wherein the at least one processor is part of a ground based system.

* * * * *